US012078942B2

(12) United States Patent
Takahashi

(10) Patent No.: US 12,078,942 B2
(45) Date of Patent: Sep. 3, 2024

(54) IMAGE FORMING APPARATUS

(71) Applicant: CANON KABUSHIKI KAISHA, Tokyo (JP)

(72) Inventor: Kyosuke Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/339,947

(22) Filed: Jun. 22, 2023

(65) Prior Publication Data

US 2024/0045356 A1 Feb. 8, 2024

(30) Foreign Application Priority Data

Jul. 29, 2022 (JP) ................................ 2022-121045

(51) Int. Cl.
*G03G 15/08* (2006.01)

(52) U.S. Cl.
CPC ..... *G03G 15/0891* (2013.01); *G03G 15/0848* (2013.01)

(58) Field of Classification Search
CPC .......... G03G 15/0848; G03G 15/0889; G03G 15/0891; G03G 15/0935
See application file for complete search history.

(56) References Cited

U.S. PATENT DOCUMENTS

2010/0028053 A1* 2/2010 Kasai ................ G03G 15/0868 399/255
2011/0052233 A1 3/2011 Sakamaki
2017/0123349 A1 5/2017 Takahashi
2018/0129152 A1* 5/2018 Iida .................... G03G 15/0848
2019/0332034 A1* 10/2019 Okamura ........... G03G 15/0815

FOREIGN PATENT DOCUMENTS

JP H0651634 A 2/1994
JP 2015106074 A 6/2015
JP 2015222393 A 12/2015

* cited by examiner

*Primary Examiner* — Hoang X Ngo
(74) *Attorney, Agent, or Firm* — Canon U.S.A., Inc. IP Division

(57) ABSTRACT

An image forming apparatus includes an image bearing member, a developing device, first and second drive portions, and a controller. The developing device includes first, second, and third conveying screws, and a developer bearing member. A ratio of a rotational driving speed (Vsc) of the first and second conveying screws by the first drive portion to a rotational driving speed (Vs1) of the developer bearing member by the second drive portion is Vsc/Vs1. A ratio of a rotational driving speed (Vsc3) of the third conveying screw by the second drive portion to the developer bearing member rotational driving speed (Vs1) is Vsc3/Vs1. In a control mode, the controller controls the first and second drive portions so that Vsc/Vs1 in a non-image forming period becomes less than Vsc/Vs1 in an image forming period such that Vsc3/Vs1 in the non-image forming period is equal to Vsc3/Vs1 in the image forming period.

19 Claims, 13 Drawing Sheets

COMPARATIVE EXAMPLE

IMAGE FORMING APPARATUS

BACKGROUND

Field

Aspects of the present disclosure generally relate to an image forming apparatus including a developing device which develops an electrostatic image formed on an image bearing member with a developer including toner and carrier.

Description of the Related Art

A developing device includes a developing sleeve serving as a developer bearing member which is rotatable to bear and convey a two-component developer including toner and carrier (hereinafter simply referred to as a “developer”) on and to a development region in which to develop an electrostatic image formed on an image bearing member. At the inside of the developing sleeve, a magnet, which has a plurality of magnetic poles and generates a magnetic field for causing the developer to be borne on the surface of the developing device, is arranged while being fixed in an irrotational manner.

Moreover, a regulating blade serving as a developer regulating member which regulates the amount of a developer to be borne on the developing sleeve is arranged opposite to the developing sleeve. The regulating blade is arranged opposite to one magnetic pole out of a plurality of magnetic poles included in the magnet. With these arrangements, a developer accumulation is formed on the upstream side of the regulating blade as viewed in the direction of movement of the surface of the developing sleeve, and, thus, a given amount of developer is able to be secured at a portion immediately upstream of the regulating blade, so that the developer can be stably supplied to the developing sleeve.

However, an immobile layer of developer may be formed on the upstream side of the regulating blade as viewed in the direction of movement of the surface of the developing sleeve. Since a developer in the immobile layer never interchanges, the developer in the immobile layer is kept the same in its toner density and is thus not subjected to frictional electrification any more. The developer in the immobile layer then becomes progressively lower in the toner charge amount over an extended period of time. As a result, at the upstream side of the regulating blade as viewed in the direction of movement of the surface of the developing sleeve, a difference occurs between the toner charge amount of a developer in the mobile layer and the toner charge amount of a developer in the immobile layer.

On the other hand, in some cases, due to the influence of, for example, a change in fluidity of a developer in the mobile layer or an irregular vibration caused by the operation of the image forming apparatus, a part of a developer in the immobile layer present at the boundary between the immobile layer and the mobile layer may collapse and become taken into the mobile layer. In these cases, as the difference between the toner charge amount of a developer in the mobile layer and the toner charge amount of a developer in the immobile layer is larger, a locally uneven density may occur when a developer in the immobile layer taken into the mobile layer has been conveyed.

Therefore, as discussed in U.S. Patent Application Publication No. 2011/0052233, there is known a technique in which a drive source which drives a conveying screw and a drive source which drives a developing sleeve are configured to perform driving independently of each other. Then, in this technique, a mode in which, in a case where the ratio of a rotational speed Vsc of the conveying screw to a rotational speed Vs1 of the developing sleeve is denoted by Vsc/Vs1, Vsc/Vs1 in a period in which image forming is not performed is made less than Vsc/Vs1 in a period in which image forming is performed (hereinafter referred to as “toner layer movement control”) is executed. With this technique employed, an immobile layer formed on the upstream side of the regulating blade as viewed in the direction of movement of the surface of the developing sleeve is collapsed.

On the other hand, a developing device discussed in U.S. Patent Application Publication No. 2011/0052233 is what is called a functional separation type developing device, in which the function of supplying a developer including toner and carrier to the developing sleeve and the function of recovering a developer from the developing sleeve are separate from each other. The functional separation type developing device includes a supply chamber from which to supply a developer including toner and carrier to the developing sleeve and a recovery chamber (also referred to as an “agitating chamber”) into which to recover, from the developing sleeve, a developer having passed through a development region facing the image bearing member. Moreover, the functional separation type developing device is able to recover a developer having passed through the development region from the developing sleeve into the recovery chamber without via the supply chamber.

In some conventional functional separation type developing devices, since a developer is progressively conveyed from the upstream side of the inside of the supply chamber as viewed in the developer conveyance direction to the downstream side thereof and a developer in the supply chamber is then progressively supplied to the developing device, the amount of a developer in the supply chamber tends to become smaller at the downstream side in the developer conveyance direction than at the upstream side. Moreover, in the functional separation type developing device, since a developer is progressively conveyed from the upstream side of the inside of the recovery chamber as viewed in the developer conveyance direction to the downstream side thereof and a developer is progressively recovered from the developing sleeve, the amount of a developer in the recovery chamber tends to become larger at the downstream side in the developer conveyance direction than at the upstream side. Therefore, in the conventional functional separation type developing device, the height of a developer surface on the downstream side of the inside of the recovery chamber in the developer conveyance direction tends to become higher than the height of a developer surface on the upstream side of the inside of the recovery chamber in the developer conveyance direction.

In such a functional separation type developing device, in a case where the toner layer movement control has been executed, the distribution of a developer in the recovery chamber tends to become biased. Therefore, depending on the developer distribution in the developing container, if the toner layer movement control is executed, a developer on the developing sleeve may be unable to be recovered into the recovery chamber and thus may overflow from the recovery chamber. This is because, in a case where the rotational speed of the conveying screw has been made lower in the toner layer movement control, a developer remains staying in the recovery chamber and the recovery chamber becomes deficient in a space for recovering a developer.

Therefore, as discussed in U.S. Patent Application Publication No. 2017/0123349, there is known a technique in which, in the functional separation type developing device, a period in which only the conveying screw is driven in a state in which driving of the developing sleeve is stopped is provided prior to the toner layer movement control in a period in which image forming is not performed. In this way, performing control to drive only the conveying screw in a state in which driving of the developing sleeve is stopped enables preliminarily securing a space for recovering a developer on the developing sleeve, thus preventing or reducing a developer from overflowing.

However, in some conventional functional separation type developing devices, it is necessary to provide a period in which only a conveying screw is driven in a state in which driving of a developing sleeve is stopped prior to a toner layer movement control in a period in which image forming is not performed. Under such circumstances, unplanned downtime occurs.

SUMMARY

Aspects of the present disclosure are generally directed to preventing or reducing a locally uneven density while preventing or reducing downtime.

According to an aspect of the present disclosure, an image forming apparatus capable of performing an image forming operation for forming an image on a recording material includes an image bearing member, a developing device including a developer bearing member that is rotatable and is configured to bear and convey, on the developer bearing member, a developer including toner and carrier to a development region in which to develop an electrostatic image formed on the image bearing member, a regulating member arranged opposite to the developer bearing member and configured to regulate an amount of the developer to be borne on the developer bearing member, a first chamber configured to supply the developer to the developer bearing member, a second chamber arranged opposite to the developer bearing member and configured to recover, from the developer bearing member, the developer that has passed through the development region, a partition wall configured to separate the first chamber and the second chamber from each other, a first conveying screw arranged in the first chamber and configured to convey the developer in a first direction, a second conveying screw arranged in a first region of the second chamber and configured to convey the developer in a second direction opposite to the first direction, and a third conveying screw arranged in a second region of the second chamber horizontally adjacent to the first region of the second chamber and configured to convey the developer in a third direction opposite to the second direction, a first drive portion configured to rotationally drive the first conveying screw and the second conveying screw, a second drive portion configured to rotationally drive the developer bearing member and the third conveying screw, and a controller configured to control the first drive portion in such a way as to rotationally drive the first conveying screw and the second conveying screw and configured to control the second drive portion in such a way as to rotationally drive the developer bearing member and the third conveying screw, wherein, in a case where a ratio of a rotational speed (Vsc) of the first conveying screw and the second conveying screw for rotationally driving the first conveying screw and the second conveying screw by the first drive portion to a rotational speed (Vs1) of the developer bearing member for rotationally driving the developer bearing member by the second drive portion is denoted by Vsc/Vs1 and a ratio of a rotational speed (Vsc3) of the third conveying screw for rotationally driving the third conveying screw by the second drive portion to the rotational speed (Vs1) of the developer bearing member for rotationally driving the developer bearing member by the second drive portion is denoted by Vsc3/Vs1, the controller is able to execute a mode for controlling the first drive portion and the second drive portion so that Vsc/Vs1 in a non-image forming period, in which the image forming operation is not being performed, becomes less than Vsc/Vs1 in an image forming period, in which the image forming operation is being performed, and, in the mode, Vsc3/Vs1 in the non-image forming period is equal to Vsc3/Vs1 in the image forming period.

Further features of the present disclosure will become apparent from the following description of exemplary embodiments with reference to the attached drawings.

DESCRIPTION OF THE EMBODIMENTS

A first exemplary embodiment is described with reference to FIG. 1 to FIG. 6. First, an outline configuration of an image forming apparatus is described with reference to FIG. 1.

<Configuration of Image Forming Apparatus>

An image forming apparatus of the electrophotographic type, such as a copying machine, a printer, a facsimile apparatus, or a multifunction peripheral including such a plurality of functions, supplies electrically charged toner from a developing device to an electrostatic image (electrostatic latent image) borne on an image bearing member, thus converting the electrostatic image into a visible image as a toner image. Then, the image forming apparatus transfers the toner image converted into a visible image to a recording material (transfer material), fixes the toner image to the recording material with heat and pressure applied thereto, and outputs the recording material with an image formed thereon.

Figure 1:
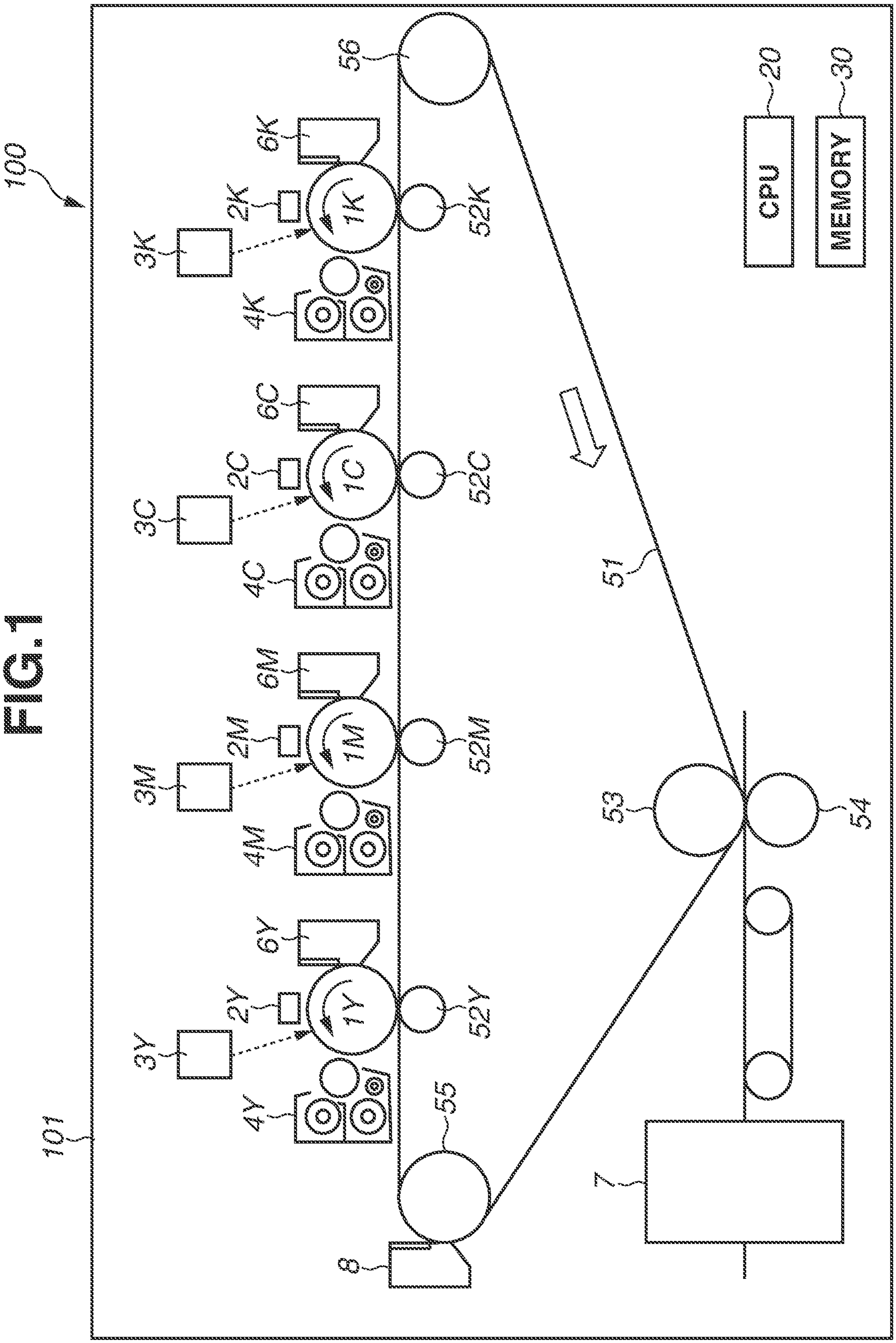
FIG. 1 is a diagram used to explain a configuration of an image forming apparatus in a first exemplary embodiment.

As illustrated in FIG. 1, an image forming apparatus 100 in the first exemplary embodiment is able to perform an image forming operation for forming an image on a recording material. The image forming apparatus 100 includes, within an image forming apparatus body 101, four image forming stations Y, M, C, and K, which respectively include photosensitive drums 1Y, 1M, 1C, and 1K each serving as an image bearing member. Each of the photosensitive drums 1Y, 1M, 1C, and 1K is a cylindrical photosensitive member. An intermediate transfer device is arranged below the image forming stations Y, M, C, and K. In the intermediate transfer device, an intermediate transfer belt 51 serving as an intermediate transfer member is suspended between rollers 53, 55, and 56 in a tensioned manner and is configured to travel in the direction of the illustrated arrow.

In the first exemplary embodiment, the image forming apparatus 100 electrically charges the surfaces of the photosensitive drums 1Y, 1M, 1C, and 1K with use of primary charging devices 2Y, 2M, 2C, and 2K of the corona charging type, which is non-contact type charging, respectively. The electrically charged surfaces of the photosensitive drums 1Y, 1M, 1C, and 1K are exposed with laser by exposure devices 3Y, 3M, 3C, and 3K, which are driven by laser drivers, respectively, so that electrostatic latent images corresponding to respective colors yellow (Y), magenta (M), cyan (C), and black (K) are formed on the photosensitive drums 1Y, 1M, 1C, and 1K. The image forming apparatus 100 develops the formed electrostatic latent images with respective developers with use of developing devices 4Y, 4M, 4C, and 4K, thus forming respective toner images of yellow, magenta, cyan, and black.

The toner images formed by the respective image forming stations are transferred onto the intermediate transfer belt 51 with transfer biases generated by transfer rollers 52Y, 52M, 52C, and 52K each serving as a primary transfer portion and are then superposed on each other. The four-color toner images formed on the intermediate transfer belt 51 are transferred to a recording material by a secondary transfer roller 54 serving as a secondary transfer portion arranged opposite to the roller 53. Toner remaining on the intermediate transfer belt 51 without being transferred to the recording material is removed by an intermediate transfer belt cleaner 8. The recording material is, for example, a sheet material such as a sheet of paper or a plastic sheet.

The recording material with the toner images transferred thereto is pressed and heated by a fixing device 7 including a fixing roller. With this heating and pressing process, the toner images are fixed to the recording material. Moreover, primary transfer residual toner remaining on the photosensitive drums 1Y, 1M, 1C, and 1K after primary transfer is removed by cleaners 6Y, 6M, 6C, and 6K, so that the image forming apparatus 100 is prepared for next image forming. Moreover, in each cleaner 6, a light-emitting diode (LED) is turned on to reduce any potential unevenness having occurred during an image forming operation, so that the image forming apparatus 100 is prepared for next image forming.

Furthermore, while, in the first exemplary embodiment, a drum-shaped photosensitive member (photosensitive drum) is used as an image bearing member, a belt-shaped photosensitive member can also be used. Moreover, the charging method, transfer method, cleaning method, and fixing method are also not limited to the above-mentioned methods. The above-mentioned respective image forming stations have the basically same configuration except having respect different developing colors. Therefore, in the following description, suffixes Y, M, C, and K, which indicate configurations of the respective image forming stations, are omitted. Furthermore, since the image forming apparatus 100 has a plurality of process speeds due to the necessity in processes of transfer and fixing corresponding to types of sheets, the developing device has a plurality of driving speeds.

<Configuration of Developing Device>

Next, the developing device 4 is described with reference to FIG. 2 to FIG. 4. The developing device 4 is arranged within the image forming apparatus body 101 and develops an electrostatic latent image formed on the image bearing member with a developer including toner and carrier. The developing device 4 includes a developing container 40, which contains the developer. The developer in the first exemplary embodiment is what is called a two-component developer including non-magnetic toner and magnetic carrier. In the developing container 40, a developing sleeve 41 serving as a developer bearing member is supported in a rotatable manner. The developing sleeve 41 is arranged in parallel with the rotational axis direction of the photosensitive drum 1 and develops an electrostatic latent image on the surface of the photosensitive drum 1 with a developer.

Moreover, at the developing container 40, a regulating blade 43 (developer regulating member), which regulates the layer thickness of a developer borne on the developing sleeve 41, is provided. The developing sleeve 41 bears, on the surface thereof, a developer supplied from a developing chamber 401 (described below) and conveys the borne developer. The developing sleeve 41 is formed in a cylindrical shape, in which a magnet roller 42 is arranged in an irrotational manner. The developing sleeve 41 is configured to be rotationally driven in the direction of an arrow illustrated in FIG. 2 and bears and conveys a developer with a magnetic attraction force provided by the magnet roller 42.

The developing container 40 is partitioned with a partition wall 48 into a developing chamber (developer conveyance path) 401, which serves as a first chamber and is located at the upside, and an agitating chamber (developer conveyance path) 402, which serves a second chamber and is located below the developing chamber 401. The developing chamber 401 is a functional chamber configured to supply a developer to the developing sleeve 41. The agitating chamber 402 is a functional chamber configured to receive and agitate a recovered developer, which has been recovered from the developing sleeve 41, a surplus developer, which has not been supplied from the developing chamber 401 to the developing sleeve 41, and a supplementary developer, which has been supplemented from the outside of the developing device 4.

Thus, the developing device 4 in the first exemplary embodiment is what is called a functional separation type developing device, in which the function of supplying a developer including toner and carrier to the developing sleeve 41 and the function of recovering a developer from the developing sleeve 41 are separate from each other. The functional separation type developing device includes a supply chamber (developing chamber 401) configured to supply a developer to the developing sleeve 41 and a recovery chamber (agitating chamber 402) configured to recover a developer having passed through a development region A, which faces the photosensitive drum 1, from the developing sleeve 41. Moreover, the functional separation type developing device is able to recover a developer having passed through the development region A into the recovery chamber (agitating chamber 402) without via the supply chamber (developing chamber 401).

The insides of the developing chamber 401 and the agitating chamber 402 contain a first conveying screw 44 serving as a first conveyance member and a second conveying screw 45 serving as a second conveyance member, respectively. Each of the first conveying screw 44 and the second conveying screw 45 is a screw member provided with a helical blade on a rotational shaft thereof arranged approximately in parallel with the rotational axis direction (longitudinal direction) of the developing sleeve 41.

Figure 2:
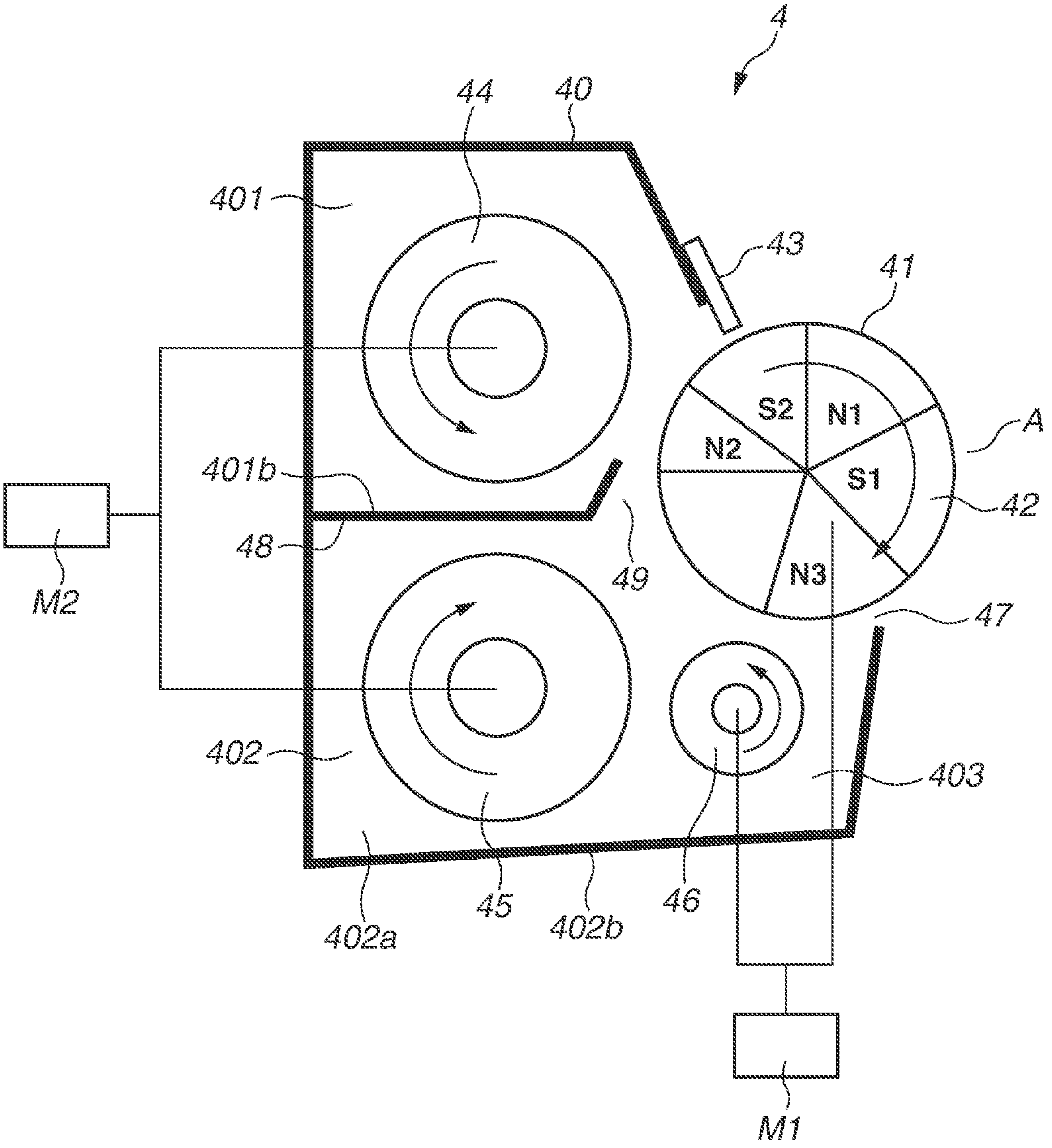
FIG. 2 is a diagram used to explain a configuration of a developing device in the first exemplary embodiment.

In the developing device 4 (functional separation type developing device) in the first exemplary embodiment, as illustrated in the sectional view of FIG. 2, a bottom portion 401*b* of the supply chamber (developing chamber 401) is located above a bottom portion 402*b* of the recovery chamber (agitating chamber 402) in vertical direction. Moreover, the rotational center of the first conveying screw 44 is located above the rotational center of the developing sleeve 41 in vertical direction. Moreover, the regulating blade 43 is located above the rotational center of the developing sleeve 41 in vertical direction.

Figure 3:
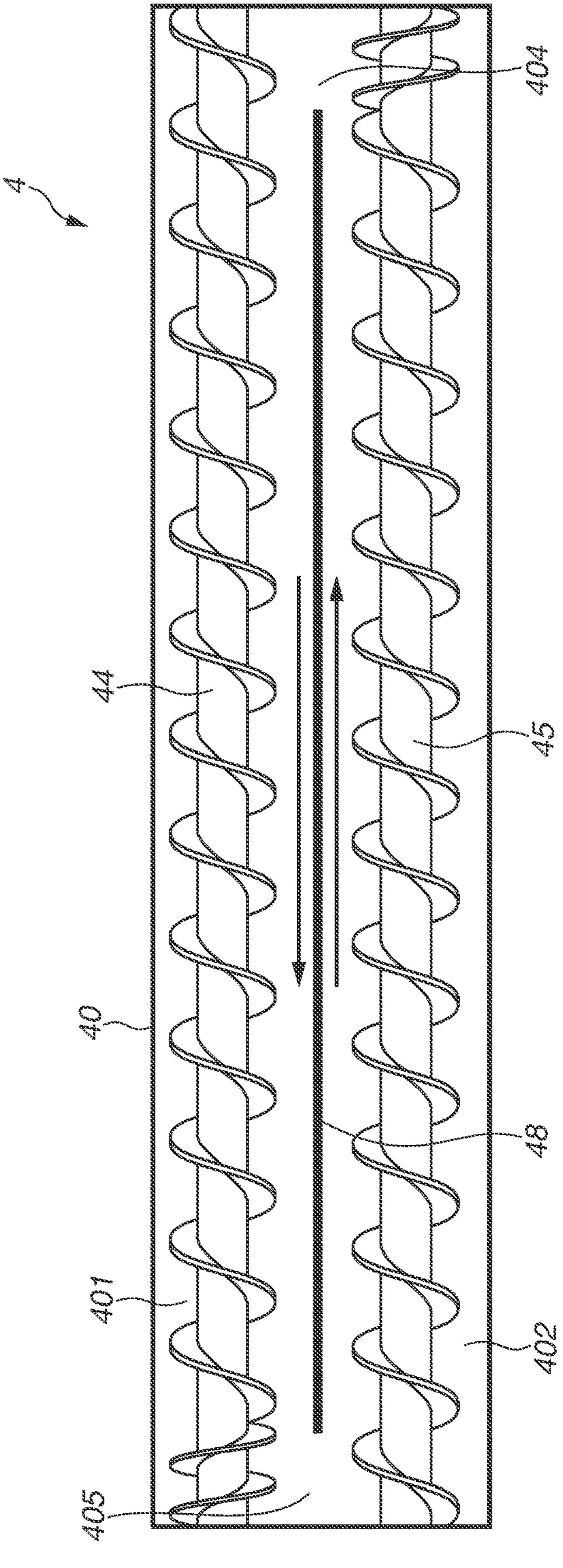
FIG. 3 is a diagram used to explain the configuration of the developing device in the first exemplary embodiment.

Moreover, as illustrated in the sectional view of FIG. 3, on both end portion sides in the longitudinal direction of the partition wall 48, there are provided a first communication portion 404 and a second communication portion 405, each of which is a transfer portion (developer conveyance path) which reciprocally transfers a developer between the developing chamber 401 and the agitating chamber 402. At the first communication portion 404, there is provided an opening portion which allows the developer to move from the agitating chamber 402 to the developing chamber 401. At the second communication portion 405, there is provided an opening portion which allows the developer to move from the developing chamber 401 to the agitating chamber 402.

The first conveying screw 44 is arranged opposite to the developing sleeve 41 and supplies the developer to the developing sleeve 41 while rotationally operating in such a way as to agitate and convey the developer in a first direction leading from the first communication portion 404 to the second communication portion 405. The second conveying screw 45 rotationally operates in such a way as to agitate and convey the developer in a second direction leading from the second communication portion 405 to the first communication portion 404. The second conveying screw 45 is arranged below the first conveying screw 44 with regard to the direction of gravitational force, and the second direction is opposite to the first direction. In this way, the rotational operation of the first conveying screw 44 and the second conveying screw 45 causes a developer contained in the developing container 40 to be circulated while being agitated and conveyed.

At the developing device 4, there is provided a third conveying screw 46 serving as a third conveyance member (agitating member). The third conveying screw 46 is arranged below the developing sleeve 41 and in a position adjacent to the second conveying screw 45, and recovers the developer from the developing sleeve 41 and agitates and conveys the developer in a direction opposite to the direction in which the second conveying screw 45 agitates and conveys the developer. The third conveying screw 46 is a screw member provided with a helical blade on a rotational shaft thereof arranged approximately parallel to the rotational axis direction of the developing sleeve 41.

In the developing device 4 configured as described above, during a developing operation, the developing sleeve 41 rotates in the direction of the arrow illustrated in FIG. 2 (clockwise direction) and bears a two-component developer which has been supplied from the developing chamber 401 and the layer thickness of which has been regulated with ear cutting of a magnetic brush performed by the regulating blade 43. Then, the developing sleeve 41 conveys the developer to the development region A adjacent to the photosensitive drum 1, thus supplying the developer to an electrostatic latent image formed on the photosensitive drum 1 and developing the latent image. After that, the developer having contributed to developing is recovered and conveyed from the developing sleeve 41 by the third conveying screw 46 and is then transferred to the second conveying screw 45.

Here, toner and carrier, which are components of a developer for use in the first exemplary embodiment, are described. Toner includes a base, which is made from a binding resin having a colorant, and an additive agent, which is added to the base. As the resin to be included in toner, in the first exemplary embodiment, a negatively charged polyester series resin is used. It is favorable that the volume average particle diameter of toner is 4 micrometers (μm) or more and 10 μm or less, and, in the first exemplary embodiment, toner of 7 μm in volume average particle diameter is used. If the particle diameter of toner is too small, toner becomes unlikely to cause friction with carrier, so that it becomes difficult to control the amount of charging, and if the particle diameter of toner is too large, it becomes impossible to form a fine and minute toner image.

As carrier, for example, a metal such as surface-oxidized or unoxidized iron, nickel, cobalt, manganese, chromium, or rare earth, an alloy of them, or oxide ferrite is able to be used, and, in the first exemplary embodiment, ferrite carrier of 40 in μm in volume average particle diameter is used. If the particle diameter of carrier is too small, there occurs an issue in which carrier adheres to a latent image bearing member during developing, and if the particle diameter of carrier is too large, there occurs an issue in which carrier disturbs a toner image during developing.

Moreover, in the first exemplary embodiment, a developer of 300 grams (g) is contained in the developing container 40, the ratio by weight of toner to carrier in a developer used at the time of installation of the developing device 4 is set to 1:9, and the toner density at that time is set to 10% in ratio by weight. Moreover, the average charge amount of toner obtained when the toner density is 10% under an environment of 23° C. in temperature and 50% in humidity becomes 40 microcoulombs per gram (μC/g).

Next, the cross-section configuration of the developing device 4 is described. In the first exemplary embodiment, the developing container 40 is provided with an opening portion in a position equivalent to the development region A opposite to the photosensitive drum 1, and the developing sleeve 41 is arranged at the opening portion in a rotatable manner in such a manner that a part of the developing sleeve 41 is exposed therefrom toward the photosensitive drum 1. As mentioned above, the magnet roller 42 incorporated in the developing sleeve 41 is fixed in an irrotational manner.

Here, the flow of a developer in the cross-section configuration is described. First, the developer jumps in conjunction with the conveyance of the developer by the first conveying screw 44 and is then supplied to the developing sleeve 41. Since magnetic carrier is contained in the developer, the developer is constrained by a magnetic force which the magnet roller 42 included in the developing sleeve 41 is generating, and, in conjunction with the rotation of the developing sleeve 41, the developer on the developing sleeve 41 passes through the regulating blade 43 and is regulated in such a way as to have a predetermined amount. The developer regulated to have a predetermined amount is conveyed to the development region A opposite to the photosensitive drum 1, so that toner is supplied to an electrostatic latent image. The developer having passed through the development region A is recovered by the third conveying screw 46 included in the developing container 40. The recovered developer is conveyed in the conveyance direction of the third conveying screw 46 and then joins together at the upstream side of the second conveying screw 45.

With regard to a driving system for the developing device 4 in the first exemplary embodiment, a drive source for driving the first conveying screw 44 and the second conveying screw 45 and a drive source for driving the developing sleeve 41 and the third conveying screw 46 are provided independently from each other. Thus, the developing sleeve 41 and the third conveying screw 46 are rotationally driven by a first motor M1 (first drive portion or first drive device). On the other hand, the first conveying screw 44 and the second conveying screw 45 are rotationally driven by a second motor M2 (second drive portion or second drive device). Each of these motors (first motor M1 and second motor M2) is a direct-current (DC) motor and is configured to perform a driving operation at a rotational speed corresponding to a conveyance speed of a recording material employed during an image forming operation (thus, the circumferential velocity of the intermediate transfer belt 51 or a process speed).

Next, the details of the developing sleeve 41 are described. The developing sleeve 41 is mounted to the developing container 40 in a rotatable manner, and is configured to convey a developer to the photosensitive drum 1 with the rotational shaft of the developing sleeve 41 being rotated by a driving force supplied from the first motor M1. In the first exemplary embodiment, the developing sleeve 41 is formed from aluminum, and the diameter of the developing sleeve 41 is set to 20 millimeters (mm) at a cross-section corresponding to a portion thereof facing the photosensitive drum 1.

The surface property of the developing sleeve 41 and the conveyance property of the developer are described. First, in a case where the surface of the developing sleeve 41 is flat and smooth as a mirror surface, since the friction between the developer and the surface of the developing sleeve 41 is extremely small, even when the developing sleeve 41 rotates, the developer is almost never conveyed. Therefore, an adequate unevenness is provided on the surface of the developing sleeve 41 to generate a frictional force between the surface of the developing sleeve 41 and the developer, so that the developer becomes able to follow the rotation of the developing sleeve 41. In the first exemplary embodiment, blasting is performed on the surface of the developing sleeve 41 to provide an unevenness with a surface roughness value of about 15 micrometers (μ).

Blasting is a processing method of spraying particles, such as abrasive powder or glass beads having a predetermined particle size distribution, under high pressure. Hereinafter, a portion subjected to blasting is referred to as a "blasting area", and a portion not subjected to blasting is referred to as a "non-blasting area". Since the developing sleeve 41 conveys a developer in the blasting area, the blasting area is required to be provided as a range somewhat broader than an image forming available area.

In the first exemplary embodiment, the range subjected to blasting and thus having a developer conveyance capability is 330 mm. Furthermore, as a method of giving the conveyance property for a developer to the surface of the developing sleeve 41, besides an example of performing blasting on the surface of the developing sleeve 41, a modification example of performing processing for forming grooves or engraved portions on the surface of the developing sleeve 41 can be employed.

The magnet roller 42 is described with reference to FIG. 2. The magnet roller 42, which is a roller-shaped magnetic field generation unit incorporated in the developing sleeve 41, is arranged while being fixed to the developing container 40. The magnet roller 42 has a developing magnetic pole S1 at a position facing the development region A. The developer forms a magnetic brush under a magnetic field which the developing magnetic pole S1 generates in the development region A, and the formed magnetic brush comes into contact with the photosensitive drum 1 rotating in the development region A and develops an electrostatic latent image as a toner image with the charged toner by electrostatic force.

The magnet roller 42 has, besides the magnetic pole S1, magnetic poles N1, N2, N3, and S2, i.e., a total of five magnetic poles. The function of each magnetic pole of the magnet roller 42 and the flow of a developer in the cross-section are described. First, in conjunction with the conveyance of the developer by the first conveying screw 44, the developer jumps and is then supplied to the developing sleeve 41. Since magnetic carrier is mixed in the developer, the developer is constrained by the magnetic pole N2. Next, in conjunction with the rotation of the developing sleeve 41, the developer passes through the magnetic pole S2 facing the regulating blade 43, thus being regulated in such a way as to have a predetermined amount.

The regulated developer passes through the magnetic pole N1, and the developer is then supplied to the magnetic pole S1 facing the photosensitive drum 1. The developer which has passed through the development region A and toner of which has been consumed for an electrostatic latent image is released from a magnetic constraint force generated by magnetic poles in an area between the magnetic pole N3 and the magnetic pole N2 and is then recovered by the third conveying screw 46. Furthermore, in the case of a configuration in which a magnetic pole between the magnetic pole S2 facing the regulating blade 43 and the developing magnetic pole S1 (in the first exemplary embodiment, the magnetic pole N1) is omitted, the conveyance of a developer may become unstable and thus may cause density unevenness.

Next, the details of the regulating blade 43 are described. To cause a developer which is borne on the developing sleeve 41 and is then supplied to an electrostatic latent image to have a predetermined amount, the regulating blade 43 is arranged to face the developing sleeve 41 at the upstream side of the development region A in the rotational direction of the developing sleeve 41. Moreover, the regulating blade 43 regulates a space through which the developer on the developing sleeve 41 is able to pass from the developing container 40 toward the photosensitive drum 1.

In the first exemplary embodiment, as a regulating member for regulating the amount of a developer, a plate-shaped regulating blade 43 extending along the rotational axis direction of the developing sleeve 41 is used. Aluminum is used as the material of the regulating blade 43. Moreover, the regulating blade 43 is arranged at the side of the developing container 40 in such a manner that the front edge of the regulating blade 43 points toward the center of the developing sleeve 41 at the more upstream side in the rotational direction of the developing sleeve 41 than the photosensitive drum 1. Due to the developing sleeve 41 rotating, a developer on the developing sleeve 41 passes through between the front edge portion of the regulating blade 43 and the developing sleeve 41 and is then conveyed to the development region A. Accordingly, adjusting a space between the regulating blade 43 and the surface of the developing sleeve 41 enables adjusting the amount of a developer which is borne on the developing sleeve 41 and conveyed to the development region A.

Furthermore, if the space between the regulating blade 43 and the developing sleeve 41 is too narrow, a foreign material included in the developer or an aggregate of toner is likely to become stuck, which is unfavorable. Moreover, if the mass per unit area of a developer which is conveyed while being borne on the developing sleeve 41 is too large, there occurs an issue in which, for example, a developer becomes stuck near a position opposite to the photosensitive drum 1 or carrier adheres to the photosensitive drum 1. On the other hand, if the mass per unit area of a developer which is conveyed while being borne on the developing sleeve 41 is too small, there occurs an issue in which it becomes impossible to develop a desired toner image and the image density becomes low. In the first exemplary embodiment, the space (SB gap) between the regulating blade 43 and the developing sleeve 41 is set to 400 μm in such a manner that the amount of conveyance of a developer becomes 30 milligrams per square centimeter (mg/cm$^2$) when the toner density obtained after the installation of the developing device 4 (in the initial state in which the developer is not yet used) is 10%.

In the first exemplary embodiment, the diameter of the developing sleeve 41 is set to 20 mm, the diameter of the photosensitive drum 1 is set to 80 mm, and the distance of closest approach between the developing sleeve 41 and the photosensitive drum 1 is set to 400 μm. This configuration enables a setting in which it is possible to perform developing in a state in which a developer conveyed to the development region A is in contact with the photosensitive drum 1. Furthermore, since the developing sleeve 41 is configured with non-magnetic aluminum and, inside the developing sleeve 41, the magnet roller 42 serving as a magnetic field generation unit is arranged in an irrotational manner, in the development region A, the developer forms a magnetic brush due to a magnetic field generated by the magnetic pole S1 located opposite to the photosensitive drum 1.

With the above-described configuration, the developing sleeve 41 rotates in the direction of the arrow illustrated in FIG. 2 during developing and thus conveys a developer regulated to have an adequate amount by the regulating blade 43 to the development region A facing the photosensitive drum 1. In the development region A, the developer forms a magnetic brush due to a magnetic field generated by the magnet roller 42 and supplies toner to an electrostatic latent image formed on the photosensitive drum 1, thus obtaining a toner image. At this time, a developing bias voltage obtained by superposing a direct-current voltage and an alternating-current voltage on each other is applied from a power source (not illustrated) to the developing sleeve 41. In the first exemplary embodiment, a direct-current voltage of −500 volts (V) and an alternating-current voltage which is a rectangular wave, the peak-to-peak voltage Vpp of which is 1500 V, and the frequency f of which is 12 kilohertz (kHz) are used. However, the direct-current voltage value and the alternating-current voltage waveform are not limited to these. Moreover, in the development region A, an electrostatic latent image is formed with laser in such a manner that a non-image forming portion on the photosensitive drum 1 is charged at −600 V and an electrostatic latent image forming portion increases in potential depending on the density of an output image.

Moreover, in the development region A, the developing sleeve 41 is moving in the forward direction relative to the movement direction of the photosensitive drum 1. The circumferential velocity ratio between the developing sleeve 41 and the photosensitive drum 1 is set to 1.5 times. While, as the circumferential velocity ratio is larger, the amount of supply of a toner becomes larger, since, if the circumferential velocity ratio is too large, an issue of, for example, toner scatter occurs, the circumferential velocity ratio is usually set to between one to two times.

In the first exemplary embodiment, there is a plurality of speeds for driving depending on types of paper to be used, and, in the case of speed 1, the circumferential velocity of the photosensitive drum 1 is 320 millimeters per second (mm/s) and the circumferential velocity of the developing sleeve 41 is 480 mm/s and, in the case of speed 2, the circumferential velocity of the photosensitive drum 1 is 160 mm/s and the circumferential velocity of the developing sleeve 41 is 240 mm/s.

Moreover, the amount of consumption of toner at the maximum density portion is 0.5 mg/cm$^2$, and, in a case where toner is consumed at a maximum for A4 size paper, 0.31 g of toner is used.

Since a developer regulated by the regulating blade 43 and having passed through the development region A is recovered at an intake portion 47 into the developing container 40, the amount of a developer which is able to pass through the intake portion 47 is set considerably larger than the amount of a developer regulated by the regulating blade 43. This is because of enabling taking in a developer at the intake portion 47 even in a case where the amount of conveyance has increased due to, for example, the shape of the regulating blade 43, the space between the regulating blade 43 and the developing sleeve 41, the magnetic force of the magnet roller 42, or the property of a developer varying in mass production or due to a developer deteriorating in use. In the first exemplary embodiment, with respect to the amount of conveyance of a developer by the developing sleeve 41 being 30 mg/cm$^2$, a space between the developing sleeve 41 and the developing container 40 is provided in such a way as to be able to take in a developer with 60 mg/cm$^2$ or more.

Here, the configuration in the longitudinal direction of the developing device 4 (in the rotational axis direction of the developing sleeve 41) is described with reference to FIG. 3. The inside of the developing container 40 is partitioned into a developing chamber (also referred to as a "supply chamber") 401 and an agitating chamber (also referred to as a recovery chamber) 402, upper and lower chambers in vertical direction, by a partition wall 48 at an approximately central portion thereof, and a developer D is contained in the developing chamber 401 and the agitating chamber 402.

A first conveying screw 44 and a second conveying screw 45, each of which is a conveyance member serving as a developer agitating and conveyance unit, are arranged in the developing chamber 401 and the agitating chamber 402, respectively. The first conveying screw 44 is arranged at the bottom portion of the developing chamber 401 along the axial direction of the developing sleeve 41. Then, the rotational shaft of the first conveying screw 44 is rotated by a driving force suppled from the second motor M2 (second drive device), so that the first conveying screw 44 conveys a developer contained in the developing chamber 401 along the axial direction and supplies the developer to the developing sleeve 41. Moreover, the second conveying screw 45 is arranged at the bottom portion of the agitating chamber 402 along the rotational axis direction of the developing sleeve 41. Then, the rotational shaft of the second conveying screw 45 is rotated by a driving force suppled from the second motor M2 (second drive device), so that the second conveying screw 45 conveys a developer contained in the agitating chamber 402 in a rotational axis direction opposite to the rotational axis direction of the first conveying screw 44.

The developing chamber 401 and the agitating chamber 402 communicate with each other at a first communication portion 404 and a second communication portion 405. The second communication portion 405 is a communication portion (also referred to as a "drawing and dropping portion") which draws and drops, into the agitating chamber 402, a developer having passed through the developing chamber 401 without being supplied from the developing chamber 401 to the developing sleeve 41.

The first communication portion 404 is a communication portion (also referred to as a "drawing and raising portion") which draws and raises, into the developing chamber 401 by the second conveying screw 45, a developer recovered from the developing sleeve 41 and a developer drawn and dropped from the developing chamber 401. Due to the conveyance caused by the rotations of the first conveying screw 44 and the second conveying screw 45, a developer is circulated between the developing chamber 401 and the agitating chamber 402 via the first communication portion 404 and the second communication portion 405, which are communication portions located at both end portions of the partition wall 48.

Figure 4:
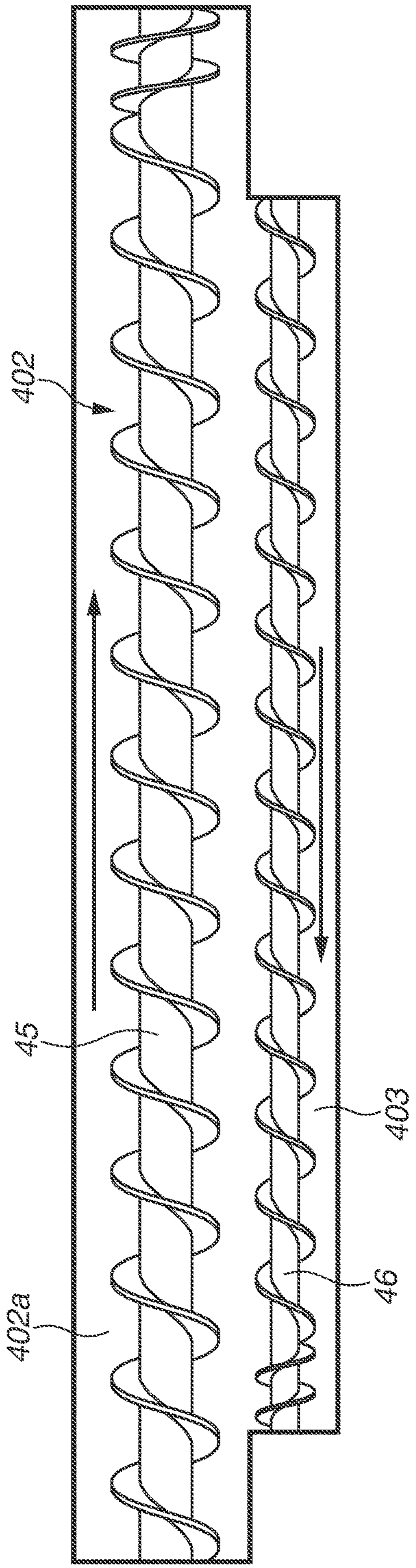
FIG. 4 is a diagram used to explain a configuration of a recovery chamber in the first exemplary embodiment.

The agitating chamber (recovery chamber) 402 is configured with, as illustrated in the sectional view of FIG. 4, two portions, i.e., a first area 402*a*, in which the second conveying screw 45 is arranged, and a second area 403, in which the third conveying screw 46 is arranged. As illustrated in the sectional view of FIG. 2, the second area 403 of the agitating chamber (recovery chamber) 402 is an area horizontally adjacent to the first area 402*a* of the agitating chamber (recovery chamber) 402.

In the second area 403, the third conveying screw 46 conveys a developer in an axial direction opposite to the rotational direction of the second conveying screw 45 and then conveys the developer to the upstream side of the first area 402*a*. Furthermore, in the first exemplary embodiment, no partition wall is provided between the first area 402*a* and the second area 403 of the agitating chamber (recovery chamber) 402. Therefore, a developer which is thrown up to the second conveying screw 45 and is conveyed by the second conveying screw 45 and a developer which is conveyed by the third conveying screw 46 may become mixed in part with each other.

Next, the conveyance path for a developer is described. As a path in which a developer is agitated and conveyed, there is a first path (a path not contributing to developing) including the supply chamber (first chamber) 401→the drawing and dropping portion 405→the recovery chamber (second chamber) 402→the drawing and raising portion 404→the supply chamber (first chamber) 401. Moreover, there is also a second path including conveyance by the first conveying screw 44 in the supply chamber (first chamber) 401→the developing sleeve 41→conveyance by the third conveying screw 46 in the recovery chamber 403→conveyance by the second conveying screw 45 in the recovery chamber 403→the drawing and raising portion 404→the supply chamber (first chamber) 401. The second path is a path passing through the drawing and raising portion 404 after contributing to developing. Furthermore, in the longitudinal direction of the recovery chamber 402, since a developer recovered from the developing sleeve 41 moves on to the drawing and raising portion 404, the amount of the developer tends to become larger as the developer moves closer to the downstream side of the recovery chamber 402, so that the amount of the developer near the drawing and raising portion 404 becomes larger.

Next, toner density control is described. The drawing and raising portion 404 of the developing device 4 is provided with a toner density sensor (inductor sensor), which detects the magnetic permeability of a developer in a fixed volume near the sensor surface thereof to calculate a ratio between toner and carrier (toner density). Then, the amount of supplementation of toner is adjusted in such a manner that the toner density calculated by the toner density sensor becomes a target toner density. Thus, when a deviation from the target toner density occurs, the amount of supplementation of toner is corrected and controlled to become coincident with the target value. Toner which is supplemented according to a result of detection by the toner density sensor is denoted by Si. In a case where the target toner density is denoted by Tt and the detected current toner density is denoted by Ts, if "Tt−Ts" is negative, Si becomes positive and, if "Tt−Ts" is positive, Si becomes negative. Moreover, since the toner density has an appropriate range, usually, the target toner density is provided with upper and lower limits. In the first exemplary embodiment, the target toner density to be used has a range of 6% to 12%.

As mentioned above with reference to FIG. 2, the regulating blade 43 serving as a developer regulating member which regulates the amount of a developer to be borne on the developing sleeve 41 is arranged opposite to the developing sleeve 41. The regulating blade 43 is arranged opposite to one magnetic pole (magnetic pole S2) out of a plurality of magnetic poles included in the magnet roller 42. With this arrangement, a developer accumulation is formed on the more upstream side in the surface movement direction of the developing sleeve 41 than the regulating blade 43 and, thus, a fixed amount of developer is able to be secured on the immediately upstream portion of the regulating blade 43, so that it becomes possible to stably supply a developer to the developing sleeve 41.

However, in some cases, an immobile layer of developer is formed on the more upstream side in the surface movement direction of the developing sleeve 41 than the regulating blade 43. Since a developer in the immobile layer never switches around, a developer in the immobile layer remains of the same toner density and is not subjected to frictional charging any more. A developer in the immobile layer progressively decreases in toner charge amount over a prolonged period. As a result, on the more upstream side in the surface movement direction of the developing sleeve 41 than the regulating blade 43, a difference occurs between the toner charge amount of a developer in a mobile layer and the toner charge amount of a developer in an immobile layer.

On the other hand, in some cases, due to the influence of, for example, a change in fluidity of a developer in the mobile layer or an irregular vibration caused by the operation of the image forming apparatus, a part of a developer in the immobile layer present near a boundary between the immobile layer and the mobile layer collapses and is then taken in the mobile layer. In these cases, as a difference between the toner charge amount of a developer in the mobile layer and the toner charge amount of a developer in the immobile layer is larger, a local density unevenness may occur when a developer in the immobile layer taken in the mobile layer has been conveyed to the development region.

Therefore, a drive source which drives the first conveying screw 44 and the second conveying screw 45 and a drive source which drives the developing sleeve 41 are provided as respective independent drive sources. Then, the ratio of the rotational speed (Vsc) of the first conveying screw 44 and the second conveying screw 45 to the rotational speed (Vs1) of the developing sleeve 41 is denoted by Vsc/Vs1. In this case, a mode of making Vsc/Vs1 obtained during non-image forming smaller than Vsc/Vs1 obtained during image forming operation (hereinafter referred to as "toner layer movement control") is executed. This mode is executed to collapse an immobile layer formed on the more upstream side in the surface movement direction of the developing sleeve 41 than the regulating blade 43.

However, in the functional separation type developing device, in a case where toner layer movement control has been performed, the distribution of a developer in the recovery chamber (agitating chamber 402) tends to become biased. Therefore, depending on the distribution of a developer in the developing container 40, if toner layer movement control is performed, a developer on the developing sleeve 41 may be unable to be recovered into the recovery chamber (agitating chamber 402) and thus may overflow. This is because, in a case where, in the toner layer movement control, the rotational speed (Vsc) of the first conveying screw 44 and the second conveying screw 45 has been made lower, a developer stagnates in the recovery chamber (agitating chamber 402) and a space for recovering a developer into the recovery chamber (agitating chamber 402) becomes insufficient.

Figure 13:
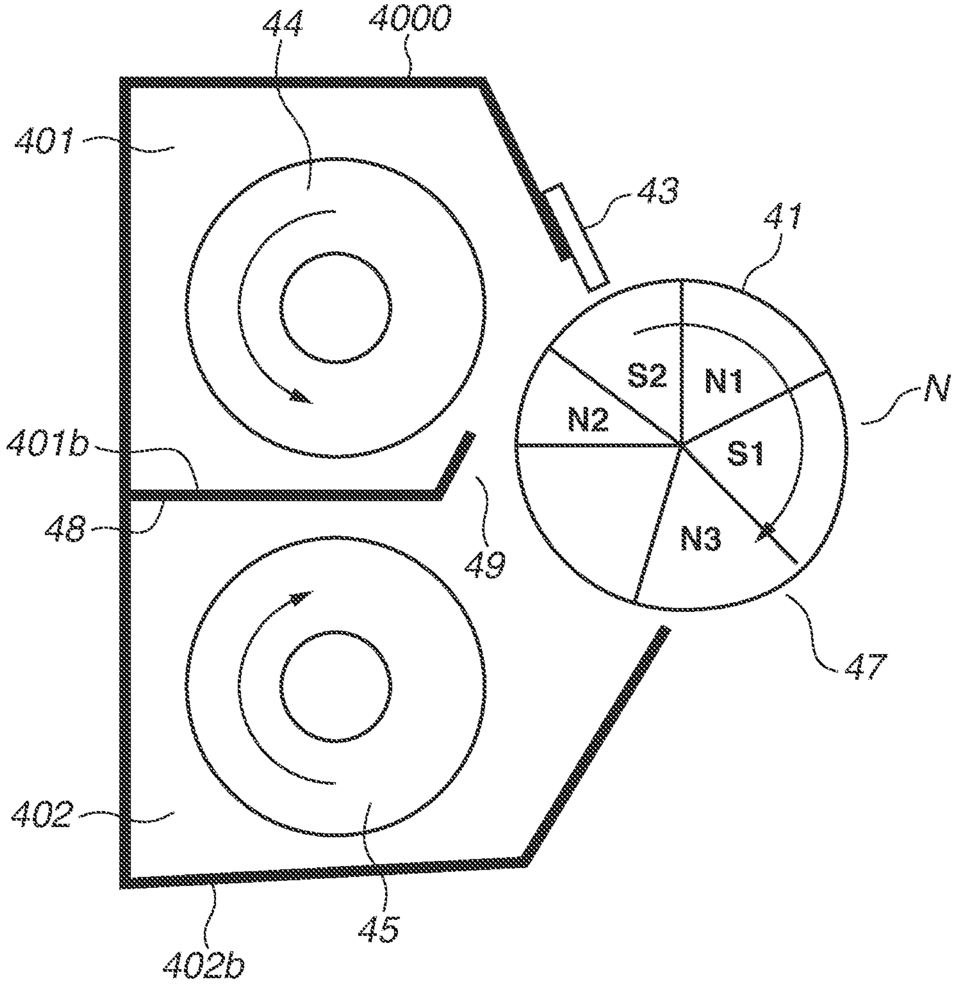
FIG. 13 is a diagram used to explain a configuration of a developing device in a comparative example.

This becomes a significant issue in a developing device in which the third conveying screw 46 is not provided in the recovery chamber (agitating chamber 402) (a developing device 4000 in a comparative example illustrated in FIG. 13).

Moreover, this becomes a significant issue in a developing device in which driving of the first conveying screw 44, the second conveying screw 45, and the third conveying screw 46 is separate from driving of the developing sleeve 41.

This is because, since, in the longitudinal direction of the recovery chamber (agitating chamber 402), a developer recovered from the developing sleeve 41 moves toward the drawing and raising portion 404, the amount of the developer tends to become larger as the developer moves toward the downstream side of the recovery chamber (agitating chamber 402). As a result, since the amount of a developer near the drawing and raising portion 404 becomes larger, the developer may overflow at the downstream side of the recovery chamber (agitating chamber 402).

On the other hand, in the developing device 4 in the first exemplary embodiment, the third conveying screw 46, in addition to the second conveying screw 45, is provided in the recovery chamber (agitating chamber 402). Moreover, in the developing device 4 in the first exemplary embodiment, driving of the first conveying screw 44 and the second conveying screw 45 is separate from driving of the third conveying screw 46 and the developing sleeve 41. In the following description, the details of them are described.

<Characteristic Configurations in First Exemplary Embodiment>

In the first exemplary embodiment, during the toner layer movement control, driving is performed in such a manner that the rotational speed of the third conveying screw 46 becomes higher than the rotational speed of the first conveying screw 44 and the second conveying screw 45.

In the first exemplary embodiment, at the time of performing toner layer movement control during non-image forming, the rotational speed of the first conveying screw 44 and the second conveying screw 45 is denoted by Vsc, the rotational speed of the developing sleeve 41 is denoted by Vs1, and the rotational speed of the third conveying screw 46 is denoted by Vsc3.

The ratio of the rotational speed (Vsc) of the first conveying screw 44 and the second conveying screw 45 to the rotational speed (Vs1) of the developing sleeve 41 is denoted by Vsc/Vs1. In this case, driving is performed in such a manner that Vsc/Vs1 obtained during toner layer movement control becomes smaller than Vsc/Vs1 obtained during image forming operation. Moreover, the ratio of the rotational speed (Vsc3) of the third conveying screw 46 to the rotational speed (Vs1) of the developing sleeve 41 is denoted by Vsc3/Vs1. In this case, driving is performed in such a manner that Vsc3/Vs1 obtained during toner layer movement control becomes equal to Vsc3/Vs1 obtained during image forming operation.

In this way, driving is performed in such a manner that Vsc3/Vs1 obtained during toner layer movement control becomes equal to Vsc3/Vs1 obtained during image forming operation. With this driving, a developer at the downstream side of the recovery chamber (agitating chamber 402), in which the amount of a developer is large, is conveyed to the upstream side of the recovery chamber (agitating chamber 402) by the third conveying screw 46, so that the overflow of a developer is prevented or reduced.

<Control in First Exemplary Embodiment>

In the first exemplary embodiment, in an image forming period for forming an image on a recording material, driving is performed with the rotational speed of the first conveying screw 44 and the second conveying screw 45 being set to 800 revolutions per minute (rpm) and the rotational speed of the third conveying screw 46 and the developing sleeve 41 being set to 600 rpm.

In a non-image forming period, in which no image forming operation is being performed, as toner layer movement control, driving of the first conveying screw 44 and the second conveying screw 45 is stopped (in other words, the rotational speed of the first conveying screw 44 and the second conveying screw 45 is set zero). Moreover, in the non-image forming period, the developing sleeve 41 and the third conveying screw 46 are driven at 600 rpm for one second.

Figure 5:
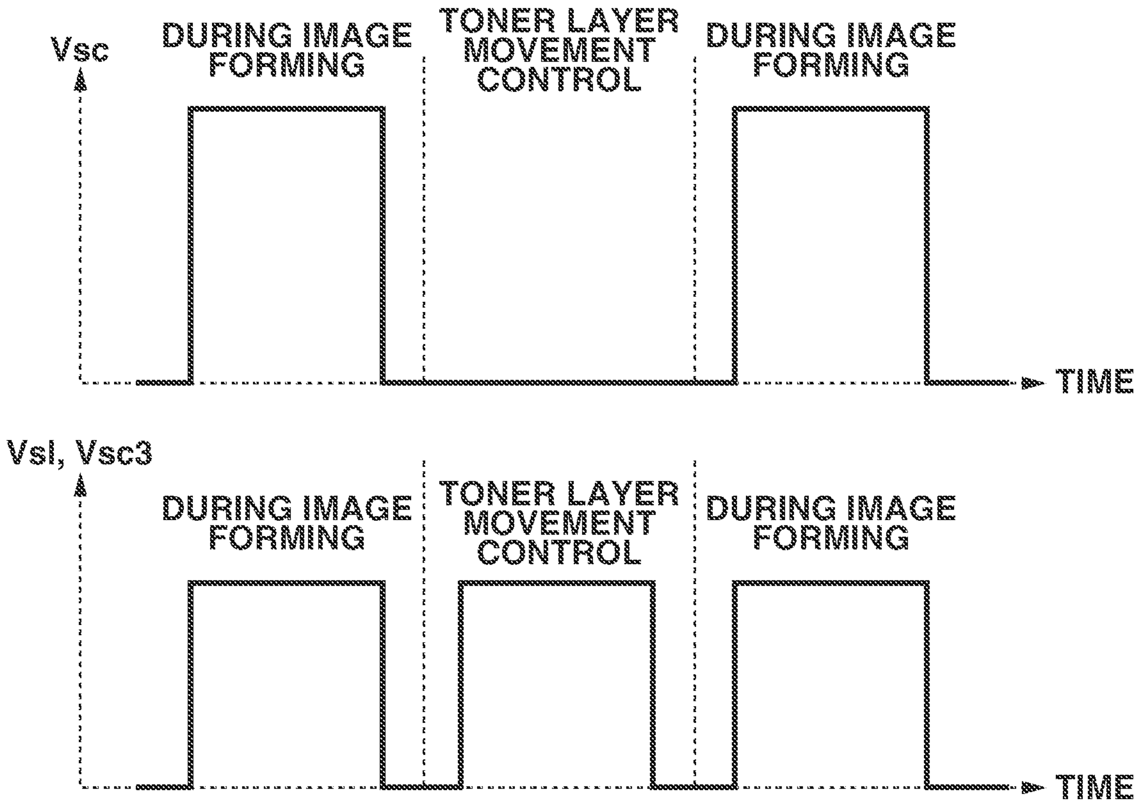
FIG. 5 is a graph illustrating a relationship between a rotational speed (Vsc) of a first conveying screw and a second conveying screw, a rotational speed (Vs1) of a developing sleeve, and a rotational speed (Vsc3) of a third conveying screw in the first exemplary embodiment.

Here, FIG. 5 illustrates a graph showing the rotational speed of the first conveying screw 44 and the second conveying screw 45 and the rotational speeds of the developing sleeve 41 and the third conveying screw 46.

In the first exemplary embodiment, a central processing unit (CPU) 20 (controller) controls the second motor M2 in such a way as to be able to change the rotational speed of the first conveying screw 44 and the second conveying screw 45. Moreover, the CPU 20 controls the first motor M1 in such a way as to be able to change the rotational speeds of the developing sleeve 41 and the third conveying screw 46. Moreover, the CPU 20 controls an integration memory for the number N of times of non-execution of toner layer movement control to discriminate execution timing of toner layer movement control.

It is necessary to perform control in the first exemplary embodiment before a toner layer blocks a gap between the regulating blade 43 and the developing sleeve 41 (SB gap). In the first exemplary embodiment, the earliest case in which a toner layer is formed to block conveyance of toner is a case where the rate of consumption of toner is 1% and the inside of the developing device 4 has increased in temperature to 45° C., and occurs with a driving time corresponding to 5,500 sheets of paper of A4 size used for image forming. From this, control in the first exemplary embodiment is performed at a point of time when a driving time corresponding to 5,000 sheets of paper has been reached. In other words, the CPU 20 performs toner layer movement control each time images are formed on a predetermined number of sheets of paper in the image forming operation.

Figure 6:
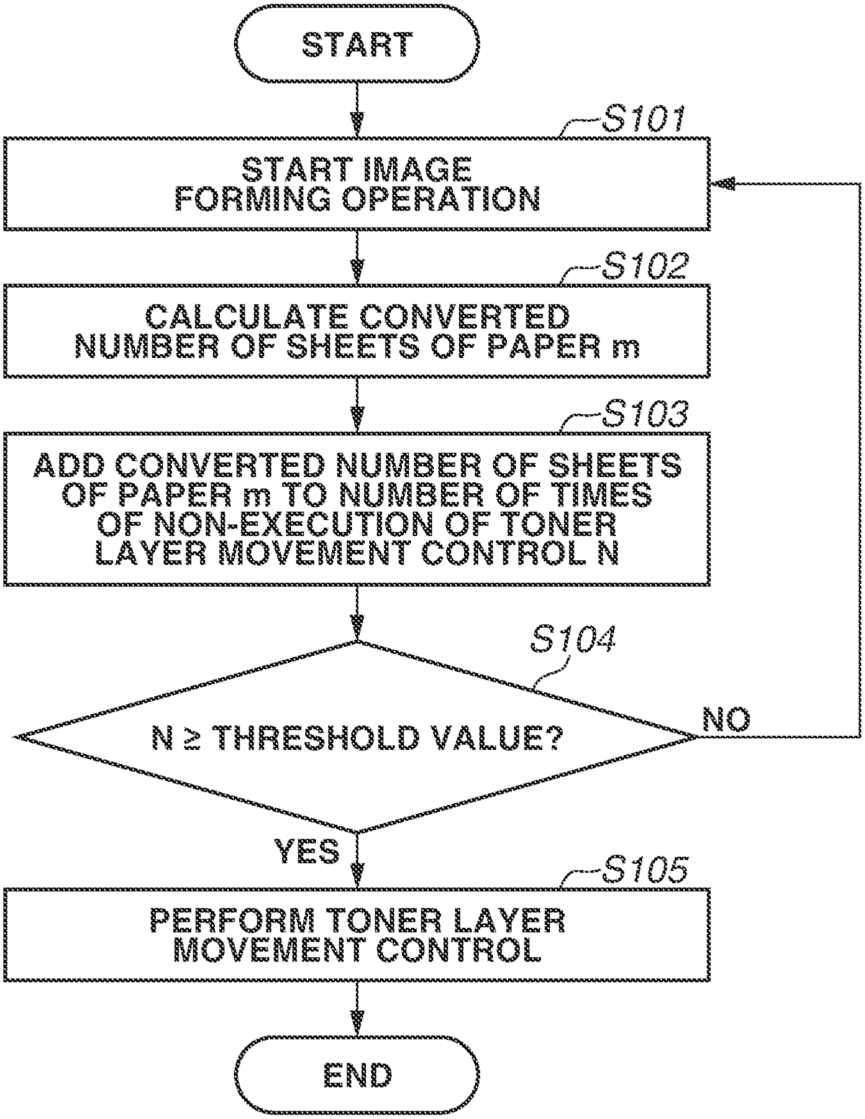
FIG. 6 is a flowchart used to explain control in the first exemplary embodiment.

Here, FIG. 6 is a flowchart illustrating control in the first exemplary embodiment.

Control illustrated in FIG. 6 is performed by the CPU 20 reading out a control program stored in a memory 30 to control various devices. Moreover, the flow of control illustrated in FIG. 6 is started after the image forming apparatus 100 has received a start instruction for image forming operation (execution instruction for a print job) (after print start).

After print start, in step S101, the CPU 20 reads out various high voltage values and rotational speeds preliminarily defined in conformity with a process speed from the memory 30, and applies the read-out various voltage values and rotational speeds to various driving systems including the first motor M1 and the second motor M2 to drive the various driving systems, thus starting an image forming operation.

Next, in step S102, the CPU 20 calculates a converted number of sheets of paper m based on A4 size for images output by the image forming operation.

Next, in step S103, the CPU 20 adds the converted number of sheets of paper m to the number of times of non-execution of toner layer movement control N, and, then in step S104, determines whether N is greater than or equal to a threshold value "5,000". If it is determined that N is greater than or equal to the threshold value "5,000" (YES in step S104), then in step S105, the CPU 20 interrupts the image forming operation and performs toner layer movement control in a non-image forming period. On the other hand, if it is determined that N is less than the threshold value "5,000" (NO in step S104), the CPU 20 returns the processing to step S101, thus continuing the image forming operation.

At the time of performing toner layer movement control during non-image forming, the rotational speed of the first conveying screw 44 and the second conveying screw 45 is denoted by Vsc, the rotational speed of the developing sleeve 41 is denoted by Vs1, and the rotational speed of the third conveying screw 46 is denoted by Vsc3. The ratio of the rotational speed (Vsc) of the first conveying screw 44 and the second conveying screw 45 to the rotational speed (Vs1) of the developing sleeve 41 is denoted by Vsc/Vs1. In this case, in toner layer movement control, driving is performed in such a manner that Vsc/Vs1 obtained during toner layer movement control becomes smaller than Vsc/Vs1 obtained during image forming operation. Moreover, in toner layer movement control, the ratio of the rotational speed (Vsc3) of the third conveying screw 46 to the rotational speed (Vs1) of the developing sleeve 41 is denoted by Vsc3/Vs1. In this case, driving is performed in such a manner that Vsc3/Vs1 obtained during toner layer movement control becomes equal to Vsc3/Vs1 obtained during image forming operation. Then, after the toner layer movement control in step S105 terminates, the CPU 20 ends a series of control operations illustrated in FIG. 6.

Furthermore, in the first exemplary embodiment, the number of driven rotations of the developing sleeve 41 used for image forming on one A4-size sheet of paper is used for a basis for calculation, and, if the number of driven rotations of the developing sleeve 41 differs depending on sizes of paper used for image forming, conversion is performed based on the number of driven rotations. For example, in the case of A3 size, which has a length twice that of A4 size, calculation is performed as two sheets of paper.

In this way, in the first exemplary embodiment, toner layer movement control is performed each time images are formed on a predetermined number of sheets of recording material in an image forming operation. Thus, driving is performed in such a manner that Vsc3/Vs1 obtained during toner layer movement control becomes equal to Vsc3/Vs1 obtained during image forming operation. With this driving, a developer at the downstream side of the recovery chamber (agitating chamber 402), in which the amount of a developer is large, is conveyed to the upstream side of the recovery chamber (agitating chamber 402) by the third conveying screw 46, so that the overflow of a developer can be prevented or reduced.

In a case where, as a result of performing toner layer movement control as in the first exemplary embodiment, the distribution of a developer in the developing container 40 has collapsed, a developer may be temporarily unable to be supplied to a part of the developing sleeve 41, so that part of a toner image to be formed may be lost. This is because performing toner layer movement control causes a developer to be biased to a portion unlike the distribution of a developer occurring during an image forming operation. Therefore, if an image forming operation is performed immediately after toner layer movement control is performed, a developer is unable to be supplied to the developing sleeve 41, so that the amount of a developer borne on the developing sleeve 41 may become smaller.

Therefore, in a second exemplary embodiment, in a non-image forming period, developer circulation control, in which, after toner layer movement control is performed, a combination of the developing sleeve 41 and the third conveying screw 46 and a combination of the first conveying screw 44 and the second conveying screw 45 are driven, is performed. Then, after developer circulation control is performed, an image forming operation is performed.

The rotational speed of the developing sleeve 41 and the third conveying screw 46 during developer circulation control is set equal to the rotational speed of the developing sleeve 41 and the third conveying screw 46 during image forming operation. Moreover, the rotational speed of the first conveying screw 44 and the second conveying screw 45 during developer circulation control is set equal to the rotational speed of the developing sleeve 41 and the third conveying screw 46 during image forming operation.

Moreover, it is favorable that a driving time for developer circulation control is a time for which a developer circulates by one revolution or more, and, in the second exemplary embodiment, driving for developer circulation control is performed for five minutes. Furthermore, while, in the second exemplary embodiment, driving is stopped one time between developer circulation control and image forming control, an image forming operation can be resumed without driving being stopped after developer circulation control. The case where an image forming operation is resumed without driving being stopped after developer circulation control leads to a reduction in downtime.

In the second exemplary embodiment, other than rotational driving of the first conveying screw 44 and the second conveying screw 45 in developer circulation control is the same as in the first exemplary embodiment. In an image forming period, driving is performed with the rotational speed of the first conveying screw 44 and the second conveying screw 45 set to 800 rpm and the rotational speed of the third conveying screw 46 and the developing sleeve 41 set to 600 rpm.

Figure 7:
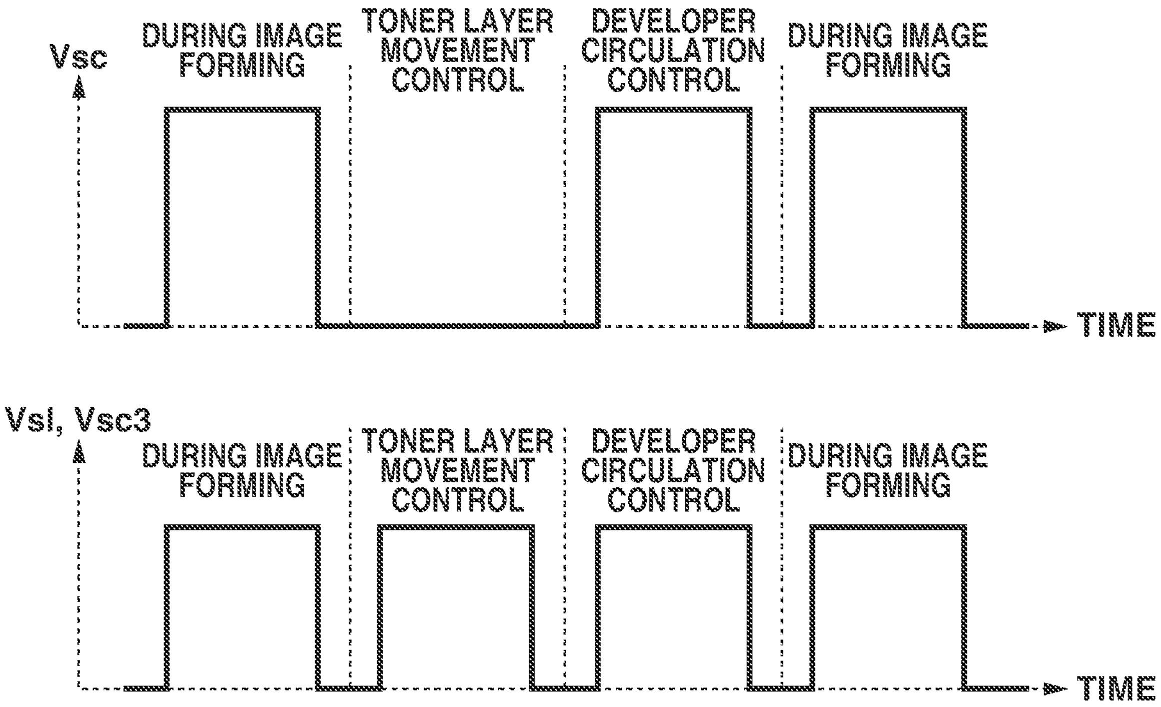
FIG. 7 is a graph illustrating a relationship between a rotational speed (Vsc) of a first conveying screw and a second conveying screw, a rotational speed (Vs1) of a developing sleeve, and a rotational speed (Vsc3) of a third conveying screw in a second exemplary embodiment.

FIG. 7 is a graph showing the rotational speed of the first conveying screw 44 and the second conveying screw 45 and the rotational speeds of the developing sleeve 41 and the third conveying screw 46 in the second exemplary embodiment.

In a non-image forming period, as toner layer movement control, driving of the first conveying screw 44 and the second conveying screw 45 is stopped and the developing sleeve 41 and the third conveying screw 46 are driven at 600 rpm for one second. After that, before an image forming operation, as developer circulation control, driving is performed for five seconds with the rotational speed of the first conveying screw 44 and the second conveying screw 45 set to 800 rpm and the rotational speed of the third conveying screw 46 and the developing sleeve 41 set to 600 rpm.

Figure 8:
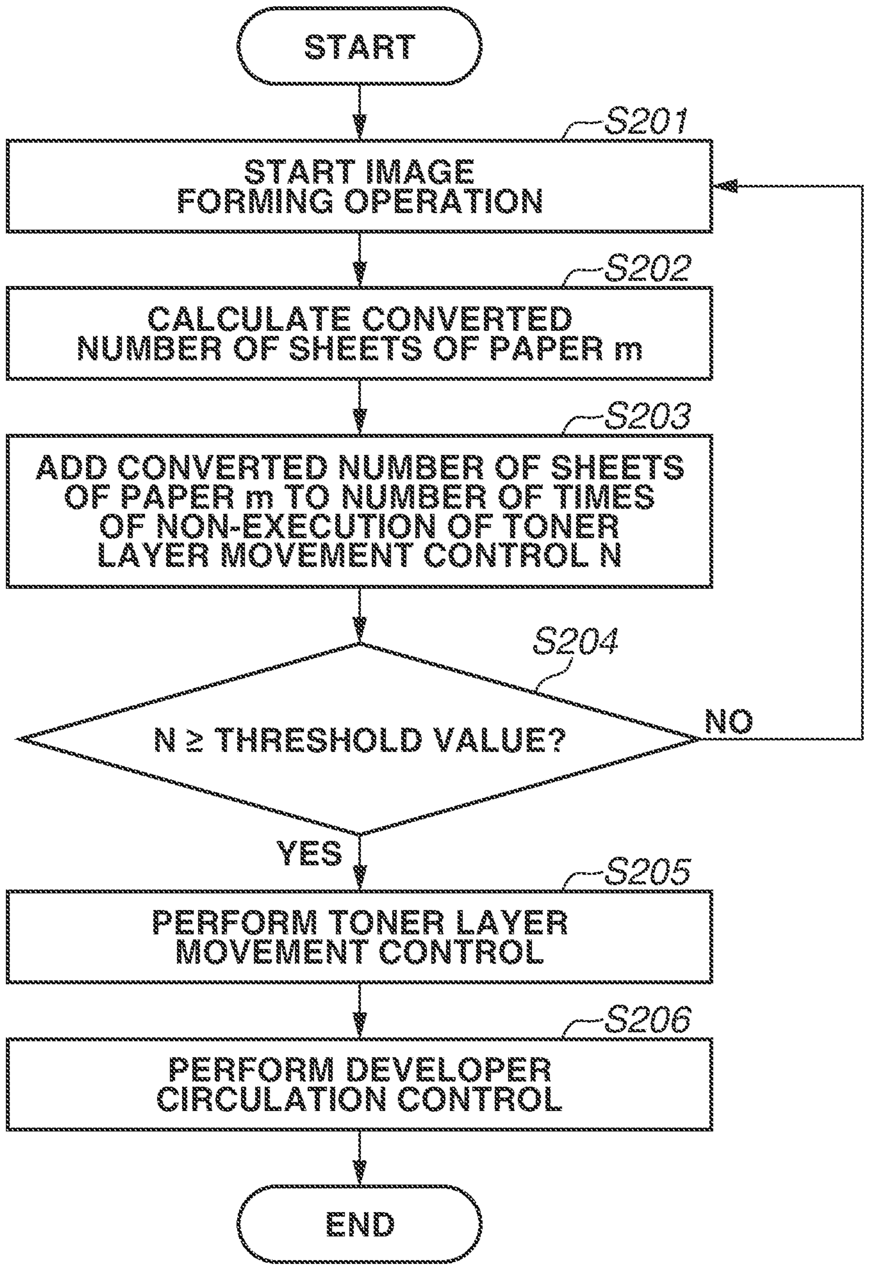
FIG. 8 is a flowchart used to explain control in the second exemplary embodiment (control in a third exemplary embodiment).

Here, FIG. 8 is a flowchart illustrating control in the second exemplary embodiment.

Control illustrated in FIG. 8 is performed by the CPU 20 reading out a control program stored in the memory 30 to control various devices. Moreover, the flow of control illustrated in FIG. 8 is started after the image forming apparatus 100 has received a start instruction for image forming operation (execution instruction for a print job) (after print start).

After print start, in step S201, the CPU 20 reads out various high voltage values and rotational speeds preliminarily defined in conformity with a process speed from the memory 30, and applies the read-out various voltage values and rotational speeds to various driving systems including the first motor M1 and the second motor M2 to drive the various driving systems, thus starting an image forming operation.

Next, in step S202, the CPU 20 calculates a converted number of sheets of paper m based on A4 size for images output by the image forming operation.

Next, in step S203, the CPU 20 adds the converted number of sheets of paper m to the number of times of non-execution of toner layer movement control N, and, then in step S204, determines whether N is greater than or equal to a threshold value "5,000". If it is determined that N is greater than or equal to the threshold value "5,000" (YES in step S204), then in step S205, the CPU 20 interrupts the image forming operation and performs toner layer movement control in a non-image forming period. On the other hand, if it is determined that N is less than the threshold value "5,000" (NO in step S204), the CPU 20 returns the processing to step S201, thus continuing the image forming operation.

After the toner layer movement control in step S205 terminates, then in step S206, the CPU 20 performs developer circulation control. Before an image forming operation, as the developer circulation control, the CPU 20 performs driving for five seconds with the rotational speed of the first conveying screw 44 and the second conveying screw 45 set to 800 rpm and the rotational speed of the third conveying screw 46 and the developing sleeve 41 set to 600 rpm. The rotational speed of the developing sleeve 41 and the third conveying screw 46 during the developer circulation control is set equal to the rotational speed of the developing sleeve 41 and the third conveying screw 46 during the image forming operation. Moreover, the rotational speed of the first conveying screw 44 and the second conveying screw 45 during the developer circulation control is set equal to the rotational speed of the developing sleeve 41 and the third conveying screw 46 during the image forming operation. Then, after the developer circulation control in step S206 terminates, the CPU 20 ends a series of control operations illustrated in FIG. 8.

Furthermore, in the second exemplary embodiment, the number of driven rotations of the developing sleeve 41 used for image forming on one A4-size sheet of paper is used for a basis for calculation, and, if the number of driven rotations of the developing sleeve 41 differs depending on sizes of paper used for image forming, conversion is performed based on the number of driven rotations. For example, in the case of A3 size, which has a length twice that of A4 size, calculation is performed as two sheets of paper.

In this way, in the second exemplary embodiment, in a non-image forming period, after toner layer movement control is performed, developer circulation control for driving a combination of the developing sleeve 41 and the third conveying screw 46 and a combination of the first conveying screw 44 and the second conveying screw 45 is performed. Then, after the developer circulation control is performed, an image forming operation is performed. This enables preventing or reducing such a phenomenon that, in an image forming operation after toner layer movement control is performed, a developer is temporarily unable to be supplied to a part of the developing sleeve 41 and, thus, part of a toner image to be formed is lost.

The image forming apparatus 100 and the developing device 4 in a third exemplary embodiment have the same configurations as those in the first exemplary embodiment except a supplementary agent S and a developer discharge port 406 provided in the developing device 4, and such same configurations are omitted from the following description. The third exemplary embodiment has a configuration of, while discharging carrier reduced in charging ability as a developer from the developer discharge port 406, supplementing a supplementary agent S including carrier and toner, thus keeping the charge ability of carrier in the developing device 4 and maintaining the charge amount of toner. In the case of such a configuration, if the amount of carrier being discharged is larger than the amount of carrier being supplemented during image forming, a developer gradually decreases and the function of the developing device 4 becomes unable to be fulfilled, and, therefore, it becomes necessary to impose a given limit on toner layer movement control or developer circulation control, which discharges a developer.

In the third exemplary embodiment, carrier C as well as toner T is supplemented as a supplementary agent S to the developing device 4. This is a coping process for a phenomenon in which, along with an image forming operation, the charge amount of carrier progressively decreases, and supplementing new carrier into the developing device 4 enables maintaining the charge ability of carrier and keeping the charge amount of toner to an appropriate range. In the third exemplary embodiment, an agent obtained by mixing toner T and carrier C at a ratio by weight of 9:1 is used as the supplementary agent S. The third exemplary embodiment is not limited to this, and can be applied to a case where a different ratio by weight is used or even a case where a configuration in which toner and carrier are supplemented separately from each other is employed.

In order to prevent a developer from overflowing from the developing device 4 due to a supplementary agent including carrier being supplemented and an excessive amount of carrier remaining within the developing device 4, usually, the developing device 4 is provided with a developer discharge port 406, from which an excessive amount of carrier is discharged together with a developer. In a case where the developing device 4 is provided with the developer discharge port 406, the amount of a developer in the developing device 4 transitions within an approximately fixed range.

Figure 9:
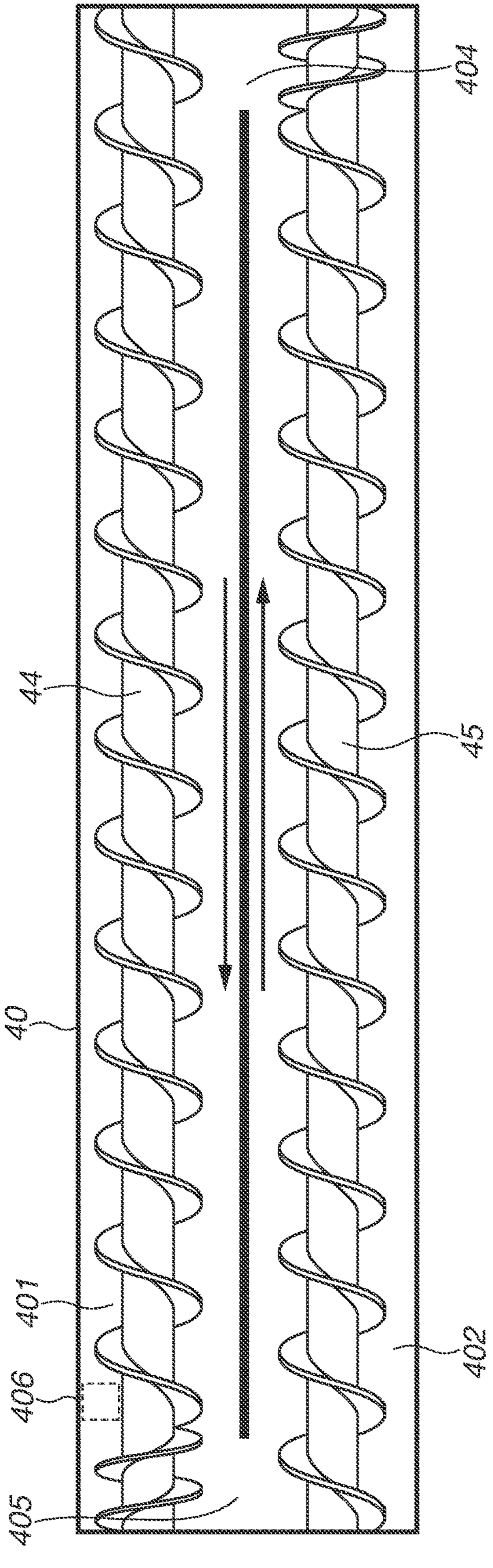
FIG. 9 is a diagram used to explain a configuration of a developing device in a third exemplary embodiment.

FIG. 9 is a sectional view illustrating a configuration of the developing device 4 in the third exemplary embodiment. The developer discharge port 406 is provided at the more downstream side than a supply portion facing the developing sleeve 41 and supplying a developer, in such a manner that an excessive toner obtained after a toner has been supplied to the developing sleeve 41 is discharged. Moreover, the developer discharge port 406 is provided at the upstream side of the supplement port in such a way as to prevent a supplementary agent from being discharged immediately after being supplemented.

As mentioned above, in order to prevent a supplementary agent from being supplied to the developing sleeve 41 without being sufficiently mixed with a developer present in the developing device 4, it is favorable that the supplement port is provided on the downstream side of an area opposite to the developing sleeve 41 in the developing chamber 401.

In the configuration of the third exemplary embodiment, if toner layer movement control is performed as in the first exemplary embodiment, the distribution of a developer collapses, and, in a case where, after that, a developer present in the developing device 4 has been excessively discharged as in the first exemplary embodiment or second exemplary embodiment, the developer becomes insufficient. If the developer becomes insufficient, a developer may be unable to be supplied to a part of the developing sleeve 41, and a part of the toner image to be developed may be lost.

This is because, since performing toner layer movement control causes a developer to be biased to a portion unlike the distribution of a developer occurring during an image forming operation, a developer having become biased during normal driving is excessively discharged when passing through the vicinity of the developer discharge port 406. In a case where, as in the third exemplary embodiment, the rotational speed of the developing sleeve 41 and the third conveying screw 46 is set relatively higher than the rotational speed of the first conveying screw 44 and the second conveying screw 45, a larger amount of developer than usual remains on the upstream side of the recovery chamber 402. If, after that, normal driving is performed, a developer is excessively discharged.

In a case where the amount of carrier being supplemented is smaller than the amount of carrier being discharged after toner layer movement control, a developer gradually decreases each time an image forming operation continues and toner layer movement control is performed, so that it becomes impossible to supply a developer to the developing sleeve 41.

In the third exemplary embodiment, in a non-image forming period, after toner layer movement control is performed, driving is performed in such a manner that the rotational speed of the developing sleeve 41 and the rotational speed of the first conveying screw 44 and the second conveying screw 45 are made lower than those during an image forming operation. At this time, the ratio (Vsc/Vs1) of the rotational speed (Vsc) of the first conveying screw 44 and the second conveying screw 45 to the rotational speed (Vs1) of the developing sleeve 41 is made smaller than that during an image forming operation, so that the amount of discharge from the developer discharge port 406 is reduced.

In the third exemplary embodiment, in a state in which driving of the developing sleeve 41 is stopped, the first conveying screw 44 and the second conveying screw 45 are driven at a speed lower than that during an image forming operation. With this driving, the vibration in vertical direction applied to a developer decreases, so that the height of the developer becomes lower, and the amount of a developer passing through the developer discharge port 406 decreases, so that discharging of the developer can be prevented or reduced.

Figure 10:
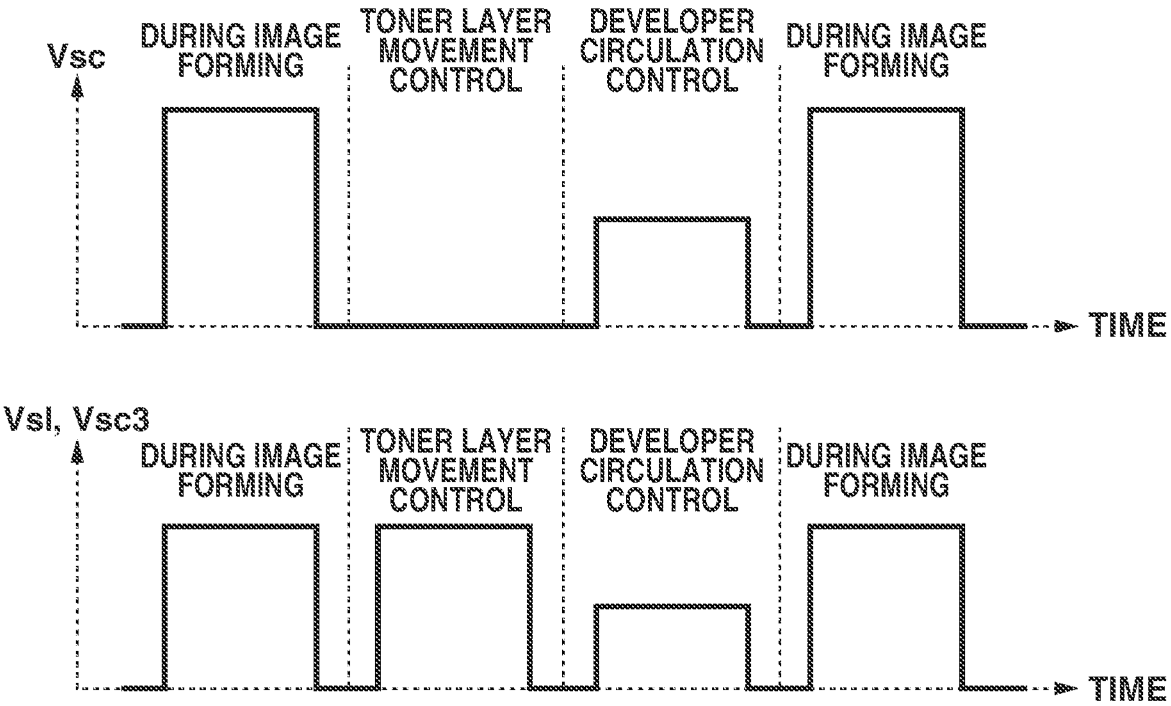
FIG. 10 is a graph illustrating a relationship between a rotational speed (Vsc) of a first conveying screw and a second conveying screw, a rotational speed (Vs1) of a developing sleeve, and a rotational speed (Vsc3) of a third conveying screw in the third exemplary embodiment.

FIG. 10 is a graph showing the rotational speed of the first conveying screw 44 and the second conveying screw 45 and the rotational speeds of the developing sleeve 41 and the third conveying screw 46 in the third exemplary embodiment.

In the third exemplary embodiment, in developer circulation control, other than the rotational driving of the first conveying screw 44 and the second conveying screw 45 is the same as in the second exemplary embodiment. In the developer circulation control, the developing sleeve 41 and the third conveying screw 46 are driven for 10 seconds at 300 rpm, and the first conveying screw 44 and the second conveying screw 45 are driven also for 10 seconds at 400 rpm. It is favorable that the time for driving is a time in which a developer at a portion where the developer has remained from the time of image forming operation passes through the developer discharge port 406.

The flowchart for illustrating control in the third exemplary embodiment is similar to that described with reference to FIG. 8 in the second exemplary embodiment. In the configuration of the third exemplary embodiment, reducing the rotational speed of the first conveying screw 44 and the second conveying screw 45 enables preventing or reducing discharging of a developer while preventing or reducing overflow of a developer. Specifically, in a case where the above-described control has been performed in the second exemplary embodiment, the amount of discharge of a developer is 1 gram (g). On the other hand, in a case where the control in the third exemplary embodiment has been performed, the amount of discharge of a developer is 0.3 g, which is a reduced value.

The image forming apparatus 100 and the developing device 4 in a fourth exemplary embodiment have the same configurations as those in the first exemplary embodiment except having a toner property detection unit and a temperature detection unit (temperature sensor).

A driving time required for a toner layer being formed differs depending on the state of a developer during driving. For example, in a case where the temperature of a developer is high, a toner layer occurs in a driving time smaller than that in a case where the temperature of a developer is low. Moreover, in a case where a toner average staying time is long (occurring in a case where the amount of toner in the developing device 4 is large and the toner property has changed upon receiving a load and in a case where image forming with a low printing rate has continued for a long period), a toner layer occurs in a shorter period than in a case where the toner average staying time is short.

The frequency of execution of the control in the first exemplary embodiment is configured in such a manner that toner layer movement control is performed at timing earlier than a situation in which a failure in conveyance of a developer occurs at the earliest time. Therefore, depending on the condition of a developer, toner layer movement control is performed earlier than necessary, so that downtime may occur.

Toner layer movement control only needs to be performed before a failure in convenience of a developer occurs. Therefore, it is possible to make execution timing of toner layer movement control appropriate according to the state of a developer and, thus, to reduce downtime caused by execution of the toner layer movement control. In the fourth exemplary embodiment, a change in toner property is estimated based on an average printing rate in past 1,000 sheets of paper. Moreover, as the temperature of a developer, a detection result provided by the temperature sensor included in the developing device 4 is used. The CPU 20 determines execution timing of toner layer movement control based on a calculation result obtained by an average printing rate calculation unit, a detection result obtained by the temperature sensor included in the developing device 4, and the number of times of non-execution of toner layer movement control (a non-execution index Ni).

Since a toner layer disturbing conveyance of a developer changes depending on a toner property and a developer temperature, a non-execution index Ni weighted depending on the state of a developer and the driving time of the developing sleeve 41 is added to the number of sheets of paper m. In the fourth exemplary embodiment, an integrating operation is performed with a case where a failure in conveyance occurs at the earliest time set to "1" and a case where a failure in conveyance occurs in the doubled time set to "0.5". (See Table 1. Weighting of the non-execution index Ni corresponding to the condition of a developer is shown.)

TABLE 1

| Weighting Index | | Temperature 40° C. or lower | 40° C. to 45° C. | 45° C. or higher |
|---|---|---|---|---|
| Average Duty | 5% or more | 0.5 | 0.7 | 0.8 |
| | 2% to 5% | 0.7 | 0.8 | 0.9 |
| | 1% to 2% | 0.8 | 0.9 | 1 |

Each time image forming is performed, the number of output sheets of paper and the non-execution index Ni for toner layer movement control are updated. The non-execution index Ni is an index obtained by accumulating an index which is determined by a temperature obtained during an image forming operation, an average printing rate in past 1,000 sheets of paper, and the size of paper used for image printing. For example, when the temperature obtained at the time of use of A4 size paper is 42° C. and the average printing rate in past 1,000 sheets of paper is 10%, "0.8" is added to the non-execution index Ni. In the execution flow for toner layer movement control, the number of times of non-execution N in the first exemplary embodiment is replaced with the non-execution index Ni.

Figure 11:
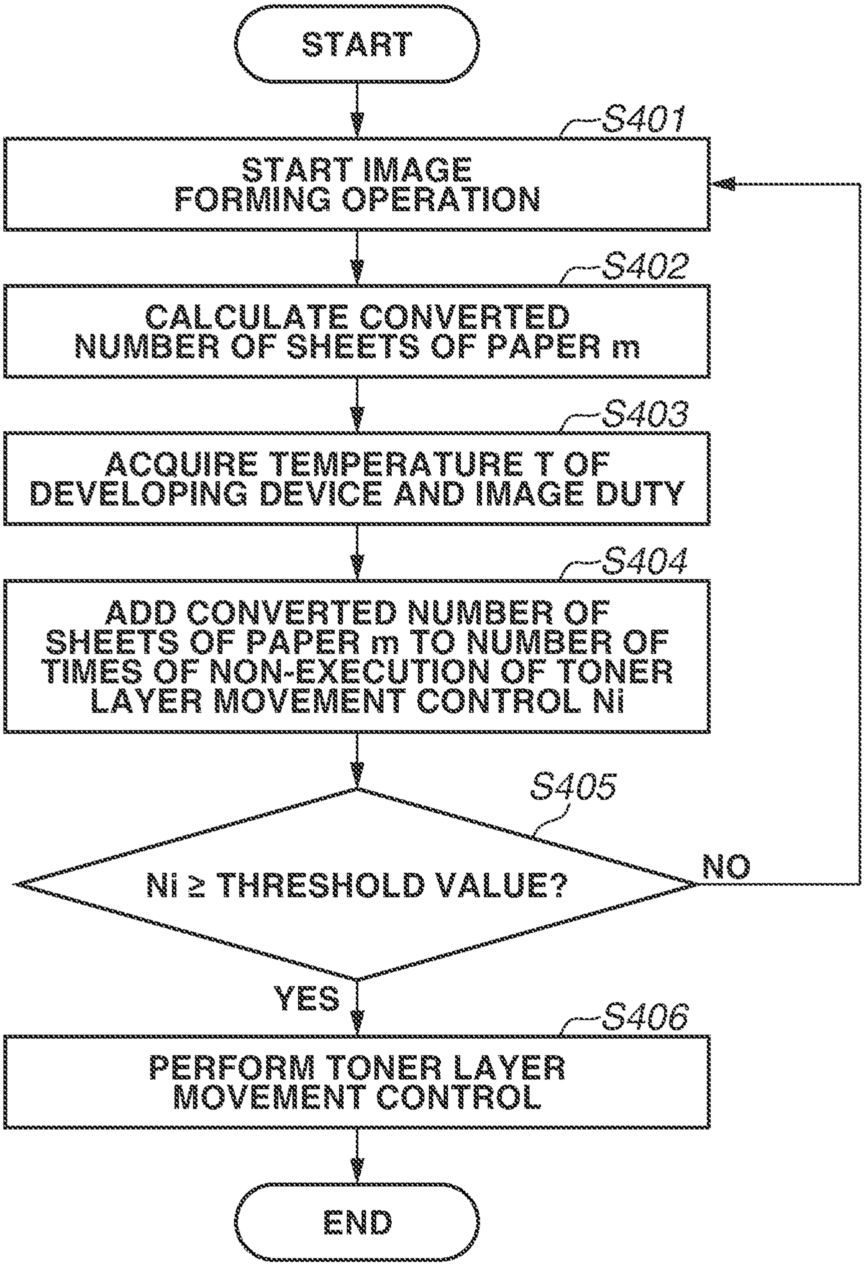
FIG. 11 is a flowchart used to explain control in a fourth exemplary embodiment.

Here, FIG. 11 is a flowchart illustrating control in the fourth exemplary embodiment.

Control illustrated in FIG. 11 is performed by the CPU 20 reading out a control program stored in the memory 30 to control various devices. Moreover, the flow of control illustrated in FIG. 11 is started after the image forming apparatus 100 has received a start instruction for image forming operation (execution instruction for a print job) (after print start).

After print start, in step S401, the CPU 20 reads out various high voltage values and rotational speeds preliminarily defined in conformity with a process speed from the memory 30, and applies the read-out various voltage values and rotational speeds to various driving systems including the first motor M1 and the second motor M2 to drive the various driving systems, thus starting an image forming operation.

Next, in step S402, the CPU 20 calculates a converted number of sheets of paper m based on A4 size for images output by the image forming operation.

Next, in step S403, the CPU 20 acquires the temperature of the developing device 4 from the temperature sensor included in the developing device 4 and acquires an image duty (printing rate), and then in step S404, the CPU 20 adds the converted number of sheets of paper m to the non-execution index Ni. Next, in step S405, the CPU 20 determines whether Ni is greater than or equal to a threshold value "5,000". If it is determined that Ni is greater than or equal to the threshold value "5,000" (YES in step S405), then in step S406, the CPU 20 interrupts the image forming operation and performs toner layer movement control in a non-image forming period. On the other hand, if it is determined that Ni is less than the threshold value "5,000" (NO in step S405), the CPU 20 returns the processing to step S401, thus continuing the image forming operation.

Furthermore, in the fourth exemplary embodiment, the number of driven rotations of the developing sleeve 41 used for image forming on one A4-size sheet of paper is used for a basis for calculation, and, if the number of driven rotations of the developing sleeve 41 differs depending on sizes of paper used for image forming, conversion is performed based on the number of driven rotations. For example, in the case of A3 size, which has a length twice that of A4 size, calculation is performed as two sheets of paper.

In the fourth exemplary embodiment, since, when the developer temperature is 39° C. and the image duty is 10%, the weighting index is "0.5" (see Table 1), the frequency of execution of toner layer movement control only needs to be half as compared with that in the first exemplary embodiment, so that downtime can be reduced.

The present disclosure is not limited to the above-described exemplary embodiments, and can be modified in various manners (including an organic combination of some of the exemplary embodiments) based on the gist of the present disclosure, and such modifications are not excluded from the scope of the present disclosure.

Figure 12:
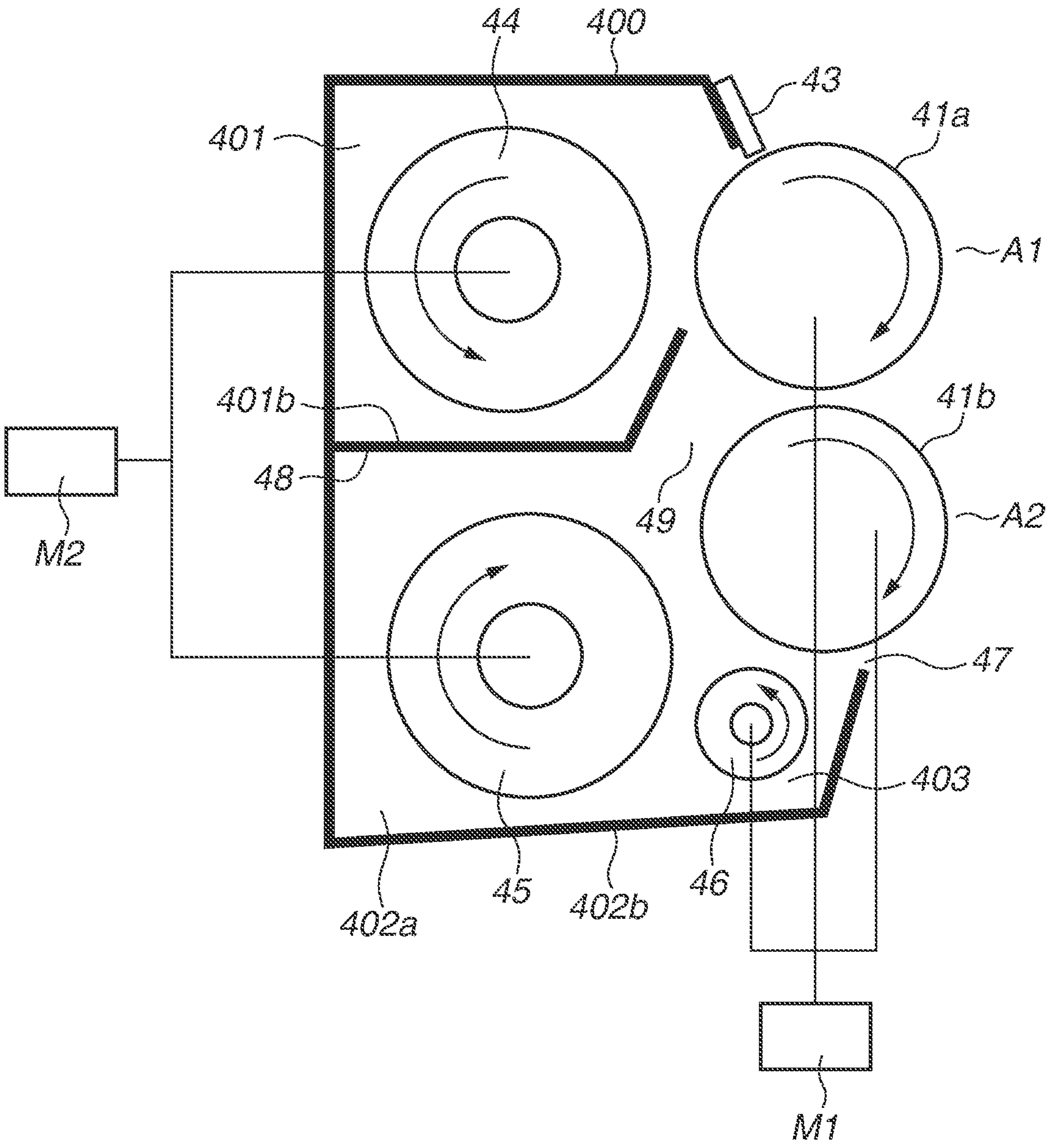
FIG. 12 is a diagram used to explain a configuration of a developing device in another exemplary embodiment.

While, in the above-described first to fourth exemplary embodiments, the developing device includes only one developing sleeve 41, a configuration including a plurality of developing sleeves 41 can also be employed. FIG. 12 is a sectional view illustrating a developing device including two developing sleeves 41 (a functional separation type developing device). In this configuration, in the developing device 400 illustrated in FIG. 12, an upstream-side developing sleeve 41*a* transfers a toner having passed through the regulating blade 43 and then having passed through a development region A1 opposite to the photosensitive drum 1 to a downstream-side developing sleeve 41*b*. Moreover, the developing device 400 is a functional separation type developing device in which a supply chamber (developing chamber 401) for supplying a developer to the upstream-side developing sleeve 41*a* and a recovery chamber (agitating chamber 402) for recovering a developer having passed through a development region A2 opposite to the photosensitive drum 1 from the downstream-side developing sleeve 41*b* are provided separately from each other. Moreover, in the developing device 400, the first conveying screw 44 and the second conveying screw 45 are rotationally driven by the second motor M2. The upstream-side developing sleeve 41*a*, the downstream-side developing sleeve 41*b*, and the third conveying screw 46 are rotationally driven by the first motor M1.

While, in the above-described exemplary embodiments, as illustrated in FIG. 1, the image forming apparatus 100 having a configuration using the intermediate transfer belt 51 has been described as an example, the above-described exemplary embodiments are not limited to this. The present disclosure can be applied to an image forming apparatus having a configuration which performs transfer by directly bringing a recording material into contact with photosensitive drums 1 in turn.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-121045 filed Jul. 29, 2022, which is hereby incorporated by reference herein in its entirety.

What is claimed is:

1. An image forming apparatus capable of performing an image forming operation for forming an image on a recording material, the image forming apparatus comprising:

an image bearing member;

a developing device including:

a developer bearing member that is rotatable and is configured to bear and convey, on the developer bearing member, a developer including toner and carrier to a development region in which to develop an electrostatic image formed on the image bearing member, a regulating member arranged opposite to the developer bearing member and configured to regulate an amount of the developer to be borne on the developer bearing member, a first chamber configured to supply the developer to the developer bearing member, a second chamber arranged opposite to the developer bearing member and configured to recover, from the developer bearing member, the developer that has passed through the development region, a partition wall configured to separate the first chamber and the second chamber from each other, a first conveying screw arranged in the first chamber and configured to convey the developer in a first direction, a second conveying screw arranged in a first region of the second chamber and configured to convey the developer in a second direction opposite to the first direction, and a third conveying screw arranged in a second region of the second chamber horizontally adjacent to the first region of the second chamber and configured to convey the developer in a third direction opposite to the second direction;

a first drive portion configured to rotationally drive the first conveying screw and the second conveying screw;

a second drive portion configured to rotationally drive the developer bearing member and the third conveying screw; and a controller configured to control the first drive portion in such a way as to rotationally drive the first conveying screw and the second conveying screw and configured to control the second drive portion in such a way as to rotationally drive the developer bearing member and the third conveying screw, wherein, in a case where a ratio of a rotational speed (Vsc) of the first conveying screw and the second conveying screw for rotationally driving the first conveying screw and the second conveying screw by the first drive portion to a rotational speed (Vs1) of the developer bearing member for rotationally driving the developer bearing member by the second drive portion is denoted by Vsc/Vs1 and a ratio of a rotational speed (Vsc3) of the third conveying screw for rotationally driving the third conveying screw by the second drive portion to the rotational speed (Vs1) of the developer bearing member for rotationally driving the developer bearing member by the second drive portion is denoted by Vsc3/Vs1, the controller is able to execute a mode for controlling the first drive portion and the second drive portion so that Vsc/Vs1 in a non-image forming period, in which the image forming operation is not being performed, becomes less than Vsc/Vs1 in an image forming period, in which the image forming operation is being performed, and, in the mode, Vsc3/Vs1 in the non-image forming period is equal to Vsc3/Vs1 in the image forming period.

2. The image forming apparatus according to claim 1, wherein, in the mode, the rotational speed of the first conveying screw and the second conveying screw in the non-image forming period is lower than the rotational speed of the first conveying screw and the second conveying screw in the image forming period.

3. The image forming apparatus according to claim 1, wherein, in the mode, the rotational speed of the first conveying screw and the second conveying screw in the non-image forming period is zero.

4. The image forming apparatus according to claim 1, wherein the controller is able to execute the mode each time images are formed on a predetermined number of sheets of recording material in the image forming operation.

5. The image forming apparatus according to claim 1, further comprising a temperature sensor configured to detect a temperature within the developing device, wherein, in a case where the temperature within the developing device detected by the temperature sensor is a first temperature, the controller is able to execute the mode each time images are formed on a first number of sheets of recording material in the image forming operation, and, in a case where the temperature within the developing device detected by the temperature sensor is a second temperature higher than the first temperature, the controller is able to execute the mode each time images are formed on a second number of sheets of recording material, the second number being smaller than the first number, in the image forming operation.

6. The image forming apparatus according to claim 1, wherein, in a case where an average printing rate is a first rate, the controller is able to execute the mode each time images are formed on a first number of sheets of recording material in the image forming operation, and, in a case where the average printing rate is a second rate lower than the first rate, the controller is able to execute the mode each time images are formed on a second number of sheets of recording material, the second number being smaller than the first number, in the image forming operation.

7. The image forming apparatus according to claim 1, wherein the first drive portion is a first motor configured to rotationally drive the first conveying screw and the second conveying screw, and wherein the second drive portion is a second motor configured to rotationally drive the developer bearing member and the third conveying screw.

8. The image forming apparatus according to claim 1, wherein the regulating member is located above a rotational center of the developer bearing member in vertical direction.

9. The image forming apparatus according to claim 1, wherein a rotational center of the first conveying screw is located above a rotational center of the developer bearing member in vertical direction.

10. The image forming apparatus according to claim 1, wherein a bottom portion of the first chamber is located above a bottom portion of the second chamber in vertical direction.

11. An image forming apparatus capable of performing an image forming operation for forming an image on a recording material, the image forming apparatus comprising:

an image bearing member;

a developing device including:

a first developer bearing member that is rotatable and is configured to bear and convey, on the first developer bearing member, a developer including toner and carrier to a first development region in which to develop an electrostatic image formed on the image bearing member, a second developer bearing member that is rotatable and is configured to bear and convey, on the second developer bearing member, the developer to a second development region in which to develop an electrostatic image formed on the image bearing member, wherein the second developer bearing member is arranged opposite to the first developer bearing member and is configured to receive the developer having passed through the first development region from the first developer bearing member, a regulating member arranged opposite to the first developer bearing member and configured to regulate an amount of the developer to be borne on the first developer bearing member, a first chamber configured to supply the developer to the first developer bearing member, a second chamber arranged opposite to the second developer bearing member and configured to recover, from the second developer bearing member, the developer that has passed through the second development region, a partition wall configured to separate the first chamber and the second chamber from each other, a first conveying screw arranged in the first chamber and configured to convey the developer in a first direction, a second conveying screw arranged in a first region of the second chamber and configured to convey the developer in a second direction opposite to the first direction, and a third conveying screw arranged in a second region of the second chamber horizontally adjacent to the first region of the second chamber and configured to convey the developer in a third direction opposite to the second direction;

a first drive portion configured to rotationally drive the first conveying screw and the second conveying screw;

a second drive portion configured to rotationally drive the first developer bearing member, the second developer bearing member, and the third conveying screw; and a controller configured to control the first drive portion in such a way as to rotationally drive the first conveying screw and the second conveying screw and configured to control the second drive portion in such a way as to rotationally drive the first developer bearing member, the second developer bearing member, and the third conveying screw, wherein, in a case where a ratio of a rotational speed (Vsc) of the first conveying screw and the second conveying screw for rotationally driving the first conveying screw and the second conveying screw by the first drive portion to a rotational speed (Vs1) of the first developer bearing member and the second developer bearing member for rotationally driving the first developer bearing member and the second developer bearing member by the second drive portion is denoted by Vsc/Vs1 and a ratio of a rotational speed (Vsc3) of the third conveying screw for rotationally driving the third conveying screw by the second drive portion to the rotational speed (Vs1) of the first developer bearing member and the second developer bearing member for rotationally driving the first developer bearing member and the second developer bearing member by the second drive portion is denoted by Vsc3/Vs1, the controller is able to execute a mode for controlling the first drive portion and the second drive portion so that Vsc/Vs1 in a non-image forming period, in which the image forming operation is not being performed, becomes less than Vsc/Vs1 in an image forming period, in which the image forming operation is being performed, and, in the mode, Vsc3/Vs1 in the non-image forming period is equal to Vsc3/Vs1 in the image forming period.

12. The image forming apparatus according to claim 11, wherein, in the mode, the rotational speed of the first conveying screw and the second conveying screw in the non-image forming period is lower than the rotational speed of the first conveying screw and the second conveying screw in the image forming period.

13. The image forming apparatus according to claim 11, wherein, in the mode, the rotational speed of the first conveying screw and the second conveying screw in the non-image forming period is zero.

14. The image forming apparatus according to claim 11, wherein the controller is able to execute the mode each time images are formed on a predetermined number of sheets of recording material in the image forming operation.

15. The image forming apparatus according to claim 11, further comprising a temperature sensor configured to detect a temperature within the developing device, wherein, in a case where the temperature within the developing device detected by the temperature sensor is a first temperature, the controller is able to execute the mode each time images are formed on a first number of sheets of recording material in the image forming operation, and, in a case where the temperature within the developing device detected by the temperature sensor is a second temperature higher than the first temperature, the controller is able to execute the mode each time images are formed on a second number of sheets of recording material, the second number being smaller than the first number, in the image forming operation.

16. The image forming apparatus according to claim 11, wherein, in a case where an average printing rate is a first rate, the controller is able to execute the mode each time images are formed on a first number of sheets of recording material in the image forming operation, and, in a case where the average printing rate is a second rate lower than the first rate, the controller is able to execute the mode each time images are formed on a second number of sheets of recording material, the second number being smaller than the first number, in the image forming operation.

17. The image forming apparatus according to claim 11, wherein the first drive portion is a first motor configured to rotationally drive the first conveying screw and the second conveying screw, and wherein the second drive portion is a second motor configured to rotationally drive the first developer bearing member, the second developer bearing member, and the third conveying screw.

18. The image forming apparatus according to claim 11, wherein the regulating member is located above a rotational center of the first developer bearing member in vertical direction.

19. The image forming apparatus according to claim 11, wherein a bottom portion of the first chamber is located above a bottom portion of the second chamber in vertical direction.

* * * * *